US011677996B2

(12) United States Patent
Davis et al.

(10) Patent No.: US 11,677,996 B2
(45) **Date of Patent: *Jun. 13, 2023**

(54) METHODS AND APPARATUS FOR AFFILIATE INTERRUPT DETECTION

(71) Applicant: The Nielsen Company (US), LLC, New York, NY (US)

(72) Inventors: Jeremey M. Davis, New Port Richey, FL (US); David H. Wright, Safety Harbor, FL (US); Alexander Topchy, New Port Richey, FL (US); Cherisse Ponraj, Dunedin, FL (US); Chris Curtis, Palm Harbor, FL (US); Jonathan Chazen, Demarest, NJ (US); Markus Kurt Cremer, Orinda, CA (US); Sharmishtha Gupta, Fremont, CA (US); Jeffrey Scott, Oakland, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/389,027

(22) Filed: Jul. 29, 2021

(65) Prior Publication Data

US 2022/0094997 A1 Mar. 24, 2022

Related U.S. Application Data

(63) Continuation of application No. 16/588,970, filed on Sep. 30, 2019, now Pat. No. 11,082,730.

(51) Int. Cl.

*H04N 21/238* (2011.01)
*H04N 21/2389* (2011.01)

(Continued)

(52) U.S. Cl.

CPC ..... *H04N 21/23892* (2013.01); *H04N 21/233* (2013.01); *H04N 21/23424* (2013.01);

(Continued)

(58) Field of Classification Search

CPC ........... H04N 21/23892; H04N 21/233; H04N 21/23424; H04N 21/26283; H04N 21/812;

(Continued)

(56) References Cited

U.S. PATENT DOCUMENTS 4,115,824 A * 9/1978 Mindell ................ G03B 31/06 360/80
7,930,714 B2 4/2011 König et al.

(Continued)

FOREIGN PATENT DOCUMENTS

CN 101946486 A 1/2011
CN 102217319 A 10/2011

(Continued)

OTHER PUBLICATIONS

Wikipedia, "Local Insertion," Oct. 3, 2017, [online] available at: https://en.wikipedia.org/wiki/Local_insertion, 3 pages.

(Continued)

*Primary Examiner* — Jefferey F Harold
*Assistant Examiner* — Timothy R Newlin
(74) *Attorney, Agent, or Firm* — Hanley, Flight & Zimmerman, LLC

(57) ABSTRACT

Methods, apparatus, systems and articles of manufacture are disclosed for affiliate interrupt detection. An example method disclosed herein includes determining whether a first time period of a first audio signal corresponds to a first affiliate interrupt period based on whether (1) a first type of watermark is detected in the first time period of the first audio signal, and (2) a second type of watermark is detected (Continued)

in the first audio signal outside the first time period but not in the first time period of the first audio signal, and determining whether the first time period of the first audio signal corresponds to the first affiliate interrupt period when watermarks are not detected in the first time period of the first audio signal based on comparison of first signatures with second signatures representing a corresponding first time period of a reference audio signal.

20 Claims, 12 Drawing Sheets

(51) Int. Cl.
*H04N 21/234* (2011.01)
*H04N 21/233* (2011.01)
*H04N 21/845* (2011.01)
*H04N 21/8358* (2011.01)
*H04N 21/262* (2011.01)
*H04N 21/81* (2011.01)

(52) U.S. Cl.
CPC ..... *H04N 21/26283* (2013.01); *H04N 21/812* (2013.01); *H04N 21/8358* (2013.01); *H04N 21/8456* (2013.01)

(58) Field of Classification Search
CPC ........... H04N 21/8358; H04N 21/8456; H04N 21/222; H04N 21/25866; H04N 21/44204; H04N 21/6582
See application file for complete search history.

(56) References Cited

U.S. PATENT DOCUMENTS 7,986,913 B2 7/2011 Wang
8,189,231 B1 5/2012 Taylor et al.
8,302,122 B1 10/2012 Hecht et al.
8,990,951 B1* 3/2015 Kruger ............... H04N 21/2541 726/32
9,055,239 B2 6/2015 Tehranchi et al.
9,071,371 B2 6/2015 Wang
9,225,444 B2 12/2015 Wang
9,258,604 B1* 2/2016 Bilobrov ............ H04N 21/4821
9,510,044 B1* 11/2016 Pereira ............ H04N 21/44204
9,544,622 B2 1/2017 Ramaswamy et al.
9,591,353 B2 3/2017 Wright et al.
11,082,730 B2 8/2021 Davis et al.
11,166,054 B2 11/2021 Fahnestock et al.
2001/0055463 A1* 12/2001 Armengaud ......... G11B 27/105 386/250
2003/0070167 A1 4/2003 Holtz et al.
2004/0062520 A1* 4/2004 Gutta ................ H04N 21/4394 386/249
2006/0195859 A1* 8/2006 Konig ............. H04N 21/44016 382/199
2006/0195861 A1* 8/2006 Lee .................... G06K 9/00523 725/19
2007/0016918 A1 1/2007 Alcorn et al.
2007/0039018 A1* 2/2007 Saslow .............. H04N 21/8352 725/19
2007/0107022 A1* 5/2007 Lawrence, III .. H04N 21/44222 725/86
2007/0143777 A1* 6/2007 Wang .................... H04H 60/43 725/18
2007/0162927 A1* 7/2007 Ramaswamy ..... H04N 21/4532 725/32
2007/0250856 A1 10/2007 Leavens et al.
2009/0094631 A1 4/2009 Whymark et al.
2009/0132339 A1 5/2009 Sloo et al.
2009/0259325 A1 10/2009 Topchy et al.
2009/0320063 A1* 12/2009 Barrett ................. H04N 21/812 725/32
2010/0302452 A1* 12/2010 Langelaar ............. G11B 27/28 348/700
2011/0128445 A1* 6/2011 Carrieres ................ H04N 5/04 348/E9.034
2011/0157475 A1* 6/2011 Wright ................ H04N 21/812 348/700
2011/0252442 A1* 10/2011 Cui ......................... H04N 5/60 725/38
2011/0264455 A1* 10/2011 Nelson .................. H04H 60/58 704/E19.009
2011/0314495 A1 12/2011 Zenor
2012/0173342 A1* 7/2012 Rajaopadhye ..... H04N 21/8358 705/14.68
2013/0031582 A1 1/2013 Tinsman et al.
2013/0276025 A1 10/2013 Sherwin et al.
2013/0298151 A1* 11/2013 Leske .................. H04L 65/611 725/116
2014/0013352 A1 1/2014 Shavit et al.
2014/0082648 A1* 3/2014 Tanner .............. G06Q 30/0277 725/14
2014/0111698 A1* 4/2014 Jain ........................ G06F 3/165 348/734
2014/0114455 A1* 4/2014 Larsen ................ H04H 60/377 700/94
2014/0282672 A1* 9/2014 McMillan ........ H04N 21/44213 725/19
2015/0082332 A1 3/2015 Wright et al.
2015/0229421 A1 8/2015 Anniballi et al.
2015/0279381 A1* 10/2015 Goesnar ................ G10L 19/018 704/500
2016/0140969 A1* 5/2016 Srinivasan ......... H04N 21/4394 704/500
2016/0150297 A1 5/2016 Petrovic et al.
2016/0180362 A1 6/2016 Brown et al.
2017/0048596 A1* 2/2017 Fonseca, Jr. ....... H04N 21/8456
2017/0094359 A1* 3/2017 Basra ................ H04N 21/2408
2017/0155972 A1* 6/2017 Goli ..................... H04N 21/812
2017/0155973 A1 6/2017 Muller et al.
2017/0264930 A1* 9/2017 Mitra .................. H04N 21/812
2018/0035174 A1 2/2018 Littlejohn
2018/0192119 A1* 7/2018 Stigall ....................... G06T 7/00
2018/0373939 A1* 12/2018 Diggins ................. G06V 20/48
2019/0313134 A1 10/2019 Fahnestock et al.
2021/0099738 A1 4/2021 Davis et al.
2022/0132185 A1 4/2022 Fahnestock et al.

FOREIGN PATENT DOCUMENTS

CN 102291608 A 12/2011
CN 103069823 A 4/2013
CN 103180869 A 6/2013
CN 103686254 A 3/2014
CN 104429091 A 3/2015
CN 105900443 A 8/2016
EP 2408126 A1 1/2012
EP 2722808 A1 4/2014
JP 2008-009442 A 1/2008
JP 2009-505234 A 2/2009
JP 2021-519557 A 8/2021
KR 10-2015-0024306 A 3/2015
WO 2007/019572 A2 2/2007
WO 2019/195431 A1 10/2019
WO 2021/067289 A1 4/2021

OTHER PUBLICATIONS

Kandhan et al., "SigMatch: Fast and Scalable Multi-Pattem Matching," Proceedings of the VLDB Endowment, vol. 3, No. 1, 2010, 12 pages.
International Searching Authority, "Written Opinion," issued in connection with International Patent Application No. PCT/US2019/025595, dated Jul. 12, 2019, 6 pages.
International Searching Authority, "International Search Report," issued in connection with International Patent Application No. PCT/US2019/025595, dated Jul. 12, 2019, 3 pages.

(56) References Cited

OTHER PUBLICATIONS

International Bureau, "International Preliminary Report on Patentability," issued in connection with International Patent Application No. PCT/US2019/025595, dated Oct. 6, 2020, 7 pages.
United States Patent and Trademark Office, "Non-Final Rejection," issued in connection with U.S. Appl. No. 15/947,569, dated Dec. 31, 2019, 16 pages.
United States Patent and Trademark Office, "Final Rejection," issued in connection with U.S. Appl. No. 15/947,569, dated Jul. 6, 2020, 16 pages.
International Searching Authority, "International Search Report," issued in connection with International Patent Application No. PCT/US2020/053301, dated Jan. 20, 2021, 3 pages.
International Searching Authority, "Written Opinion," issued in connection with International Patent Application No. PCT/US2020/053301, dated Jan. 20, 2021, 5 pages.
United States Patent and Trademark Office, "Non-Final Rejection," issued in connection with U.S. Appl. No. 15/947,569, dated Jan. 6, 2021, 16 pages.
United States Patent and Trademark Office, "Notice of Allowance," issued in connection with U.S. Appl. No. 16/588,970, dated Mar. 24, 2021, 5 pages.
United States Patent and Trademark Office, "Notice of Allowance," issued in connection with U.S. Appl. No. 16/588,970, dated Nov. 30, 2020, 8 pages.
United States Patent and Trademark Office, "Notice of Allowance," issued in connection with U.S. Appl. No. 15/947,569, dated Jun. 29, 2021, 13 pages.
China National Intellectual Property Administration, First Notification of Office Action issued in connection with Chinese Patent Application No. 201980035656.8, dated Dec. 28, 2021, 23 pages including partial English translation.
European Patent Office, "Extended European Search Report," issued in connection with European Patent Application No. 19781249.8-1208, dated Dec. 14, 2021, 9 pages.
Japanese Patent Office, "Decisioin to Grant a Patent," issued in connection with Japanese Patent Application No. 2020-554249, dated Dec. 14, 2021, 5 pages including partial English translation.
Korean Intellectual Property Office, "Notice of Submission of Opinion," issued in connection with Korean Patent Application No. 10-2020-7030809, dated Jan. 19, 2022, 13 pages including partial English translation.
Korean Intellectual Property Office, "Patent Decision Document," issued in connection with Korean Patent Application No. 10-2020-7030809, dated Jun. 7, 2022, 4 pages including partial English translation.
International Searching Authority, "International Preliminary Report on Patentability," issued in connection with International Application No. PCT/US2020/053301, dated Apr. 5, 2022, 6 pages.
The State Intellectual Property Office of People'S Republic of China, "The Second Office Action," issued in connection with Chinese Patent Application No. 201980035656.8, dated Aug. 3, 2022, 8 pages, with English translation.
The State Intellectual Property Office of People'S Republic of China, "Notice of Decision of Granting Patent Right for Invention," issued in connection with Chinese Patent Application No. 201980035656.8, dated Dec. 23, 2022, 5 pages, with English translation.

* cited by examiner

METHODS AND APPARATUS FOR AFFILIATE INTERRUPT DETECTION

RELATED APPLICATION

This patent arises from a continuation of U.S. patent application Ser. No. 16/588,970 (now U.S. Pat. No. 11,082,730), which was filed on Sep. 30, 2019. U.S. patent application Ser. No. 16/588,970 is hereby incorporated herein by reference in its entirety. Priority to U.S. patent application Ser. No. 16/588,970 is hereby claimed.

FIELD OF THE DISCLOSURE

This disclosure relates generally to media monitoring and, more particularly, to methods and apparatus for affiliate interrupt detection.

BACKGROUND

For years, national broadcasters have allocated time for local commercials to be inserted into programming on local affiliate stations displaying national broadcasts. Some local affiliate broadcasters utilize such local insertion opportunities to display local advertisements, while others display national advertisements, or display alternative programming. National broadcasters can alert local affiliate stations to such commercial insertion opportunities and the local affiliate stations can select a course of action.

BRIEF DESCRIPTION OF THE DRAWINGS

The figures are not to scale. In general, the same reference numbers will be used throughout the drawing(s) and accompanying written description to refer to the same or like parts.

Figure 1:
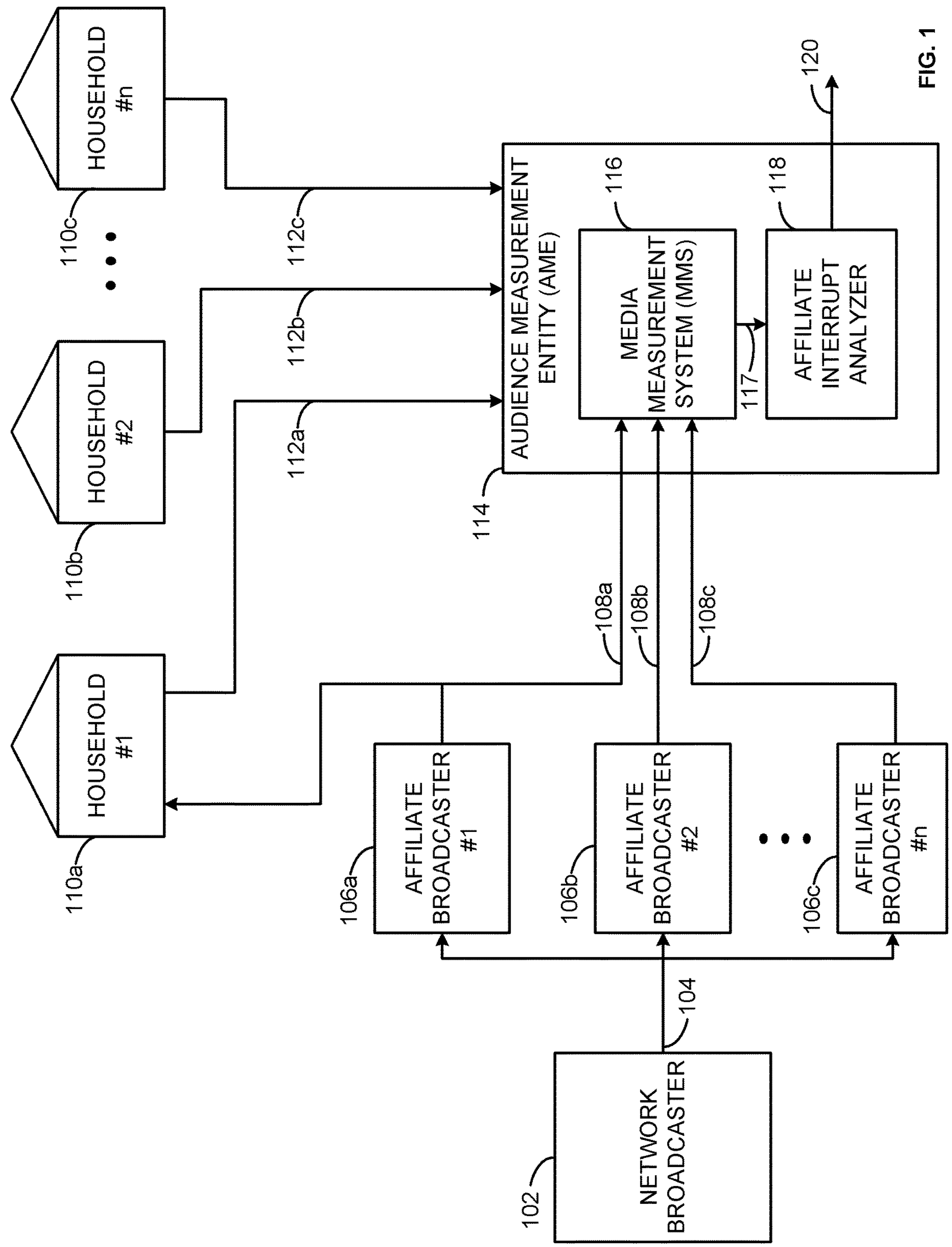
FIG. 1 is a schematic diagram of an example environment for implementing example affiliate interrupt detection techniques disclosed herein.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

National broadcasts are often distributed by a network broadcaster to multiple affiliate stations (e.g., stations within the same network, etc.) for display. For example, an affiliate station (e.g., a station that directly broadcasts to a specific area, group of subscribers, etc.) may display nationally distributed broadcasts in addition to, or alternatively to, local broadcasts. As used herein, affiliate stations may also be referred to as local stations, local broadcasters, local affiliate stations, local affiliate broadcasters, and the like. As used herein, network broadcasters may be referred to as networks, national networks, and the like. Further, as used herein, network broadcaster may also refer to a broad media distribution entity.

Affiliate stations that present network broadcasts are given the opportunity to insert their own content, such as local advertisements or other local programing, at specific times throughout the network broadcast. An example network broadcast may include, for example, a two-minute local (e.g., associated with a region, area, locality, etc.) interrupt. During a local interrupt (also referred to herein as an affiliate interrupt, a local affiliate interrupt, and the like), a local affiliate station inserts content that may be different from the media signal provided from the network broadcaster. In such an example, the network broadcast may include network advertisements (e.g., commercials, etc.) produced by the network broadcaster as an option for the local affiliates to broadcast during the local commercial insertion opportunity. In some examples, the local affiliate station may broadcast local advertisements (e.g., advertisements relevant to local businesses, relevant to local current affairs, relevant to sponsors or affiliates of the local affiliate station, etc.) during the local commercial insertion opportunity. In some examples, local affiliate stations may interrupt broadcasts in order to present alternative programming (e.g., a local news alert, an emergency alert, a long-form infomercial, etc.). In some such examples, the local affiliate stations may begin such alternative programming at any point in the network broadcast, including at a local insertion opportunity. As used herein, the term "broadcast" refers to any signal conveying media.

Audience measurement entities (AMEs) desire knowledge on how users interact with media devices such as smartphones, tablets, laptops, smart televisions, etc. In particular, AMEs, also referred to as media monitoring companies and the like, want to monitor media presentations made at the media devices to, among other things, monitor exposure to advertisements, determine advertisement effectiveness, determine user behavior, identify purchasing behavior associated with various demographics, etc. AMEs may provide information to network broadcasters indicating when local interrupts occurred, to help the network broadcasters ensure their programming is being broadcast as expected (e.g., to ensure local affiliate stations are not interrupting the network broadcast at times when they do not have permission to do so). For example, the network may be interested in identifying local interrupts occurring at unexpected times (e.g., in the middle of a show, spaced apart from a commercial pod, etc.)

AMEs may be able to utilize some existing techniques to identify when local insertion opportunities exist, but these techniques may be unable to provide information as to whether the local affiliate station actually interrupted the network broadcast during at least some of these opportunity periods, and/or may be unable to indicate other times (outside of those times when the network broadcaster identifies local insertion opportunities) when the network broadcast was interrupted. In some examples, network broadcasters may issue cue tones, which are signals inserted into the broadcast that are identifiable by local affiliates. A cue tone may be, for example, a dual-tone multi-frequency (DTMF) tone. In some examples, an AME (e.g., The Nielsen Company (US), LLC) can identify and detect the cue tones in signals to identify local commercial insertion opportunities. In some examples, the identification may be in the form of Society of Cable Telecommunication Engineers-Standard 35 (SCTE-35) codes. SCTE-35 codes are a digital form of indicator similar to cue tones which are carried in the broadcasting stream, and can be used to indicate local insertion opportunities. An AME can identify and detect SCTE-35 codes or cue tones in broadcast signals to identify local commercial insertion opportunities. However, knowledge of these opportunities may not indicate whether a local affiliate station actually interrupted the network broadcast.

Further, sometimes a network broadcaster may utilize another method, which is difficult or impossible for an AME to detect, to indicate to local affiliate stations that a commercial insertion opportunity exists. For example, a network broadcast may transmit a signal included in the network broadcast signal in white space (e.g., unused frequencies, etc.) of the network broadcast signal. In such an example, an AME may have difficulty detecting, or may not be able to detect, the identification of the local insertion opportunity, as the AME may not be informed as to the specific white space utilized to indicate the local insertion opportunity, and/or may not be able to detect the white space signal. In some examples, network broadcasters may communicate with local affiliates via an inaccessible method, such as directly contacting the affiliate stations via email. In such an example, an AME may not have access to such emails or other direct contact communications.

Conventionally, an entity (e.g., an AME) may track local commercial insertion opportunities by tuning into broadcast signals and attempting to detect and identify indications of such opportunities (e.g., cue tones, SCTE-35 codes, etc.). However, with numerous types of indications being developed and utilized, such an approach may vary depending on the specific affiliate station. Further, identification of the local insertion opportunities may not indicate (1) whether the network broadcast was actually interrupted, and (2) whether the network broadcaster was interrupted at times aside from the local insertion opportunities. As a result, it may difficult, if not impossible, for an AME to identify all local interrupts across a range of affiliate stations. Such local interrupt data may be desired for verification of local commercial presentations by advertisers, competitor local commercial analysis by advertisers, and/or for use by any research entities to add another layer of granularity to media monitoring data, etc.

Example methods, systems, and articles of manufacture are disclosed herein for affiliate interrupt detection. In some example methods, systems, and articles of manufacture disclosed herein, affiliate interrupts are detected via watermarks. In some such examples, the presence of network watermarks and the presence of local watermarks can be utilized to determine when affiliate interrupts occurred.

In some example methods, systems, and articles of manufacture disclosed herein, affiliate interrupts are detected via audio signature comparison between an affiliate signal and a reference signal. In some such examples, affiliate interrupts are detected when signatures generated based on the affiliate signal do not match signatures generated based on a reference signal corresponding to the network broadcaster for an interrupt duration threshold.

In some example methods, systems, and articles of manufacture disclosed herein, affiliate interrupts are detected via audio signature comparison between a group of affiliate signals. In some such examples, affiliate interrupts are detected when one or more of the affiliate signals does not match a first number of matching affiliate signals in the group and the number of mismatching affiliate signals during the time period satisfies a difference quantity threshold and/or the time period satisfies a duration threshold.

In some example methods, systems, and articles of manufacture disclosed herein, affiliate interrupts are detected via video signature comparison between an affiliate signal and a reference signal and/or between a group of affiliate signals. In some such examples, video signatures can be generated based on one or more affiliate signals, and in some examples, video signatures can be generated based on a reference signal (e.g., corresponding to the network broadcaster).

As used herein, the term "media" includes any type of content and/or advertisement delivered via any type of distribution medium. Thus, media includes television programming or advertisements, radio programming or advertisements, movies, web sites, streaming media, etc.

Some example techniques disclosed herein utilize audio watermarking. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Some example techniques disclosed herein utilize signature-based media monitoring. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

FIG. 1 is a schematic diagram of an example environment 100 for implementing affiliate interrupt detection techniques disclosed herein. The example environment includes an example network broadcaster 102, an example network signal 104, example affiliate broadcasters 106*a-c*, example affiliate broadcast signals 108*a-c*, example households 110*a-c*, example media monitoring signals 112*a-c*, an example audience measurement entity (AME) 114, an example media measurement system (MMS) 116, an example affiliate interrupt analyzer 118, and example interrupt report data 120.

The example network broadcaster 102 of the illustrated example of FIG. 1 communicates media signals to the affiliate broadcasters 106*a-c* for distribution to a broad audience. In some examples, the network broadcaster 102 encodes watermarks (e.g., network codes) into media signals to enable subsequent tracking of the media signals as they are presented. In some examples, the network broadcaster 102 is a media distributor that receives media from content creators (e.g., television studios, movie studios, individual content creators, etc.) and distributes the media to a broader audience. In some examples, the AME 114 can directly access the network signal 104, which may be utilized as a reference signal for affiliate interrupt detection. In some examples, the network broadcaster 102 is an internet-based broadcaster (e.g., providing streaming media content). In some examples, the network broadcaster 102 is a national television network broadcaster.

The example network signal 104 of the illustrated example of FIG. 1 is communicated by the network broadcaster 102 to the affiliate broadcasters 106*a-c*. In some examples, the network signal 104 includes a network watermark that can be detected at the AME 114 (e.g., by the affiliate interrupt analyzer 118). The network signal 104 is received by the affiliate broadcasters 106*a-c*, which can interrupt broadcasting of portions of the network signal 104 to incorporate affiliate media content (e.g., local commercials, local programming, etc.) into a broadcast. The network signal 104 may include video and/or audio media.

The example affiliate broadcasters 106*a-c* of the illustrated example of FIG. 1 broadcast media to viewers/listeners. The affiliate broadcasters 106*a-c* transmit the affiliate broadcast signals 108*a-c*. The affiliate broadcasters 106*a-c* may transmit the affiliate broadcast signals 108*a*-c to a specific area (e.g., via antenna transmission technology, via cable distribution, via the Internet, etc.).

The example affiliate broadcast signals 108*a-c* of the illustrated example of FIG. 1 include at least portions of the network signal 104. In some examples in which one or more of the affiliate broadcasters 106*a-c* do not interrupt the network signal 104 with affiliate programming, the affiliate broadcast signals 108*a-c* are identical to the network signal 104. In some examples, portions of the network signal 104 are replaced with media selected for insertion by the one or more of the affiliate broadcasters 106*a-c* (e.g., causing an "affiliate interrupt"). The affiliate broadcast 106*a-c* may be accessible to viewers in different areas. For example, the first affiliate broadcaster 106*a* may broadcast in the Louisville area, the second affiliate broadcaster 106*b* may broadcast in the Philadelphia area, etc. In the illustrated example of FIG. 1, the first household 110*a* is able to access the first affiliate broadcast signal 108*a* from the first affiliate broadcaster 106*a*.

The example households 110*a-c* of the illustrated example of FIG. 1 represents locations at which media is accessed. In some examples, the households 110*a-c* are not physical locations, but instead represent devices which may access media signals (e.g., a smartphone, a radio, etc.). In some examples, the households 110*a-c* may include monitoring devices utilized by the AME 114 to detect and/or identify media presented at the households 110*a-c*. For example, one or more of the households 110*a-c* may correspond to panelist households. Panelists are users registered on panels maintained by a ratings entity (e.g., an audience measurement company) that owns and/or operates the ratings entity subsystem. In the illustrated examples, the households 110*a-c* communicate the media monitoring signals 112*a-c* to the AME 114. In some examples, the media monitoring signals 112*a-c* are communicated from a monitoring device (e.g., a personal media monitor device) at the households 110*a-c* to the AME 114. The first household 110*a* accesses the first affiliate broadcast signal 108*a* from the first affiliate broadcaster 106*a*. In some examples, ones of the households 110*a-c* may access affiliate broadcast signals from other affiliate broadcasters.

The example media monitoring signals 112*a-c* of the illustrated example of FIG. 1 represent media and/or data pertaining to media observed at the households 110*a-c*. For example, media monitoring devices may record or otherwise collect data on media that is presented in a respective household, transmitting such data as the media monitoring signals 112*a-c* to the AME 114.

The example AME 114 of the illustrated example of FIG. 1 accesses the media monitoring signals 112*a-c* to determine media metrics (e.g., viewership, reach, etc.). The AME 114 of the illustrated example includes the MMS 116 and the affiliate interrupt analyzer 118.

The example MMS 116 of the illustrated example of FIG. 1 accesses the affiliate broadcast signals 108*a-c*. The MMS 116 may include one or more locations configured to access a plurality of media signals to enable broad media monitoring by the AME 114. In some examples, the MMS 116 may be equipped with long-distance receiving equipment to access media signals in other localities (e.g., to access affiliate broadcast signals from affiliates that are not local to the MMS 116). In some examples, the MMS 116 includes multiple systems at different locations, positioned to access as many different media signals as possible. In some examples, the MMS 116 accesses the network signal 104 directly. The MMS 116 communicates example media signals 117 and/or data associated with media signals (e.g., signatures, watermarks, etc.) to the affiliate interrupt analyzer 118 to be utilized for detecting affiliate interrupts.

The example affiliate interrupt analyzer 118 of the illustrated example of FIG. 1 detects affiliate interrupts in the media signals 117. The affiliate interrupt analyzer 118 may access the media signals 117 directly from the MMS 116 and/or from other components of the AME. In some examples, the affiliate interrupt analyzer 118 accesses watermarks and/or signatures corresponding to the media signals. An example structure of the affiliate interrupt analyzer 118 and example techniques performed by the affiliate interrupt analyzer 118 are illustrated and described in FIG. 2 and the flowcharts of FIGS. 3-7B.

The example interrupt report data 120 of the illustrated example of FIG. 1 is an output of the affiliate interrupt analyzer 118 including indications of affiliate interrupts detected in the affiliate broadcast signals 108*a-c*. In some examples, the interrupt report data 120 may be communicated by the AME 114 to the network broadcaster 102 to inform the network broadcaster 102 of periods of the network signal 104 that were interrupted in the affiliate broadcast signals 108*a-c*.

Figure 2:
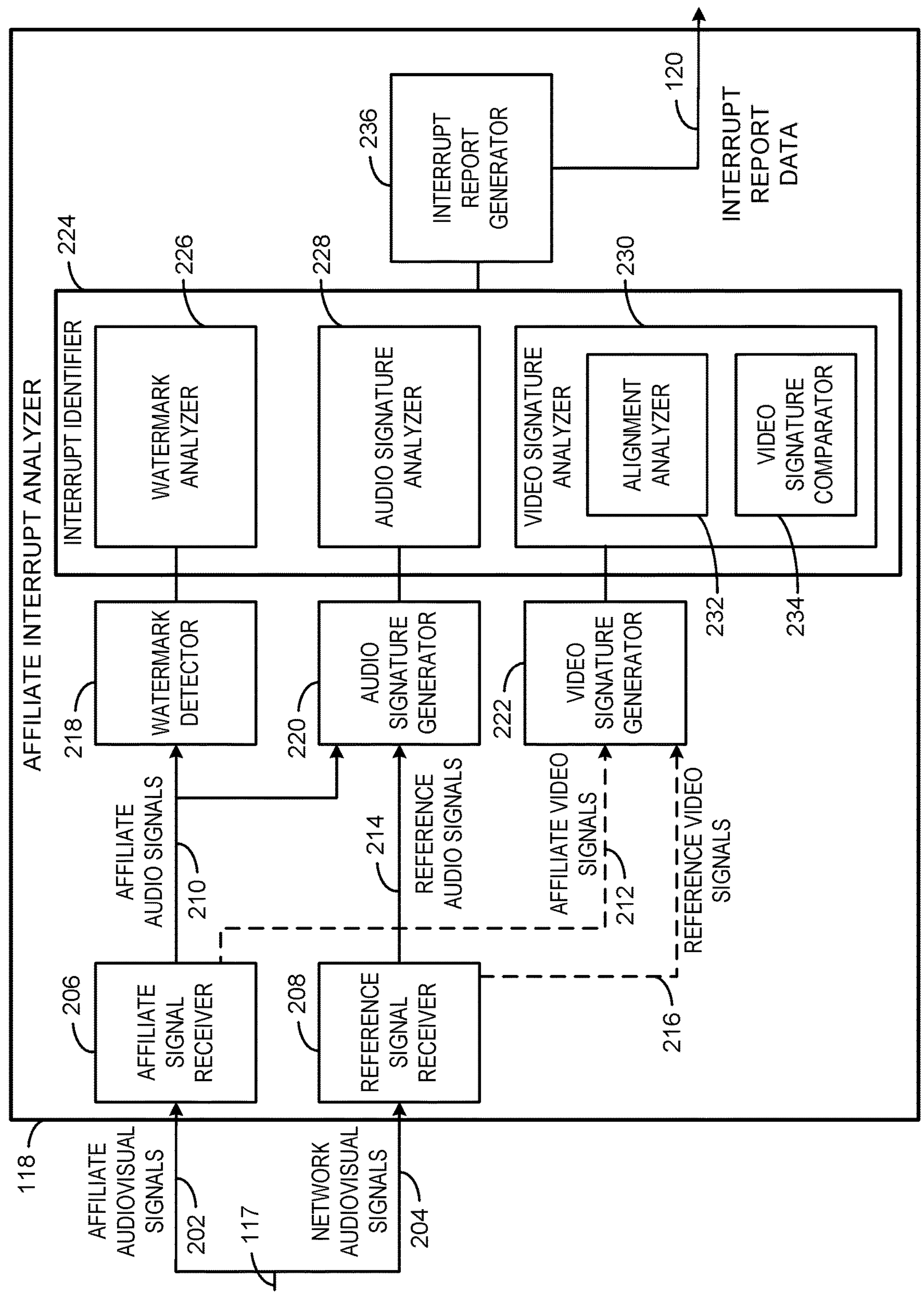
FIG. 2 is a block diagram of an example affiliate interrupt analyzer to detect affiliate interrupts in accordance with teachings of this disclosure.

FIG. 2 is a block diagram of an example affiliate interrupt analyzer 118 to detect affiliate interrupts in accordance with the teachings of this disclosure. The example affiliate interrupt analyzer 118 accesses example affiliate audiovisual signals 202 and network audiovisual signals 204 as part of the media signals 117 from the MMS 116. The affiliate interrupt analyzer 118 includes an example affiliate signal receiver 206, an example reference signal receiver 208, an example watermark detector 218, an example audio signature generator 220, an example video signature generator 222, an example interrupt identifier 224, an example watermark analyzer 226, an example audio signature analyzer 228, an example video signature analyzer 230, an example alignment analyzer 232, an example video signature comparator 234, and an example interrupt report generator 236. The example interrupt report generator generates the interrupt report data 120.

The example affiliate signal receiver 206 of the illustrated example of FIG. 2 accesses the affiliate audiovisual signals 202. In some examples, the affiliate audiovisual signals 202 and the network audiovisual signals 204 are communicated from the MMS 116 to the affiliate interrupt analyzer 118, and are included in the media signals 117. In some examples, the affiliate audiovisual signals 202 and/or the network audiovisual signals 204 are accessed from another component at the AME 114. In some examples, the affiliate signal receiver 206 includes communication infrastructure (e.g., antennas, cable connections, Internet connectivity, etc.) to access the affiliate audiovisual signals 202. In some examples, the affiliate audiovisual signals 202 are received from the MMS 116 and/or another component of the AME 114. In the illustrated example, the affiliate signal receiver 206 communicates the affiliate audio signals 210 to the watermark detector 218 and/or the audio signature generator 220. In the illustrated example, the affiliate signal receiver 206 communicates the affiliate video signals to the video signature generator 222.

The example reference signal receiver 208 of the illustrated example of FIG. 2 accesses the network audiovisual signals 204. In some examples, the reference signal receiver 208 includes communication infrastructure (e.g., antennas, cable connections, Internet connectivity, etc.) to access the network audiovisual signals 204. In some examples, the reference signal receiver 208 receives the network audiovisual signals 204 from the MMS 116 and/or another component of the AME 114. In the illustrated example, the reference signal receiver 208 communicates the reference audio signals to the audio signature generator 220 and the reference video signals 216 to the video signature generator 222. As used herein, the network audiovisual signals 204 are sometimes referred to as "reference signals," as they represent the original network broadcast (without any interrupts caused by affiliate broadcasters) and thus can be utilized as a reference against which to compare affiliate broadcasts.

The example watermark detector 218 of the illustrated example of FIG. 2 detects watermarks in the affiliate audio signals 210. In some examples, the watermark detector 218 is able to discern between watermarks encoded by a network (e.g., network codes) and watermarks encoded by an affiliate (e.g., final distributor codes, also referred to as "local" codes). For example, the watermark detector 218 may be able to determine whether a watermark is a network watermark or a local watermark by a length of a code, a manner in which the code is embedded, data that is determined based on decoding the code, and/or any other technique. In some examples, the watermark detector 218 includes a watermark decoder to determine identifying information based on the watermarks detected in the affiliate audio signals 210. The watermark detector 218 of the illustrated example of FIG. 2 communicates with the watermark analyzer 226 to enable detection of interrupt periods based on watermarks encoded in the affiliate audio signals 210. In some examples, in response to the watermark detector 218 not detecting watermarks in the affiliate audio signals 210, the interrupt identifier 224 may utilize other techniques (e.g., audio signatures, video signatures, etc.) to detect affiliate interrupts.

The example audio signature generator 220 of the illustrated example of FIG. 2 generates and/or accesses audio signatures for the affiliate audio signals 210 and the reference audio signals 214. In some examples, audio signatures for the affiliate audio signals 210 and/or the reference audio signals 214 may be generated separately (e.g., at another component of the AME 114). In some examples, the audio signature generator 220 generates and/or accesses audio signatures corresponding to the affiliate audio signals 210 and/or the reference audio signals 214 in response to a determination by the interrupt identifier 224 to utilize signatures for affiliate interrupt detection (e.g., in the event watermarks are not available). The audio signature generator 220 communicates with the audio signature analyzer 228 to enable detection of affiliate interrupts based on audio signatures.

The example video signature generator 222 of the illustrated example of FIG. 2 generates and/or accesses video signatures for the affiliate video signals 212 and/or the reference video signals 216. In some examples, video signatures for the affiliate video signals 212 and/or the reference video signals 216 may be generated separately (e.g., at another component of the AME 114). In some examples, the video signature generator 222 generates and/or accesses video signatures based on a determination by the interrupt identifier 224 to utilize video signature comparison for affiliate interrupt identification. The video signature generator 222 communicates with the video signature analyzer 230 to enable affiliate interrupt detection.

The example interrupt identifier 224 of the illustrated example of FIG. 2 detects affiliate interrupts represented in the affiliate audiovisual signals 202. The interrupt identifier 224 may utilize one or more of watermarks detection, audio signature comparison, and/or video signature comparison to detect affiliate interrupts in the affiliate audiovisual signals 202. In some examples, the interrupt identifier 224 is configured with logic to cause such techniques (watermarks, audio signatures, video signatures) to be utilized based on a preference. For example, the interrupt identifier 224 may utilize the watermark analyzer 226 to detect affiliate interrupts when watermarks are detected by the watermark detector 218, to avoid generating audio and/or video signatures. In some examples, if audio and/or video signatures are already available, the interrupt identifier may preferably utilize the audio signature analyzer 228 or the video signature analyzer 230 to detect affiliate interrupts. In some examples, the video signature analyzer 230 may be utilized to improve the accuracy with which time periods corresponding to affiliate interrupts are determined, as the video signatures may include additional differentiable features that are not comprehensible from the audio signatures or watermarks. In some examples, the interrupt identifier 224 utilizes as many of the affiliate interrupt detection techniques as possible (e.g., utilizing the watermark analyzer 226 if watermarks are detected by the watermark detector 218 and utilizing the audio signature analyzer 228 and the video signature analyzer 230 for signature comparison). The interrupt identifier 224 of the illustrated example of FIG. 2 may utilize any one or more of the watermark analyzer 226, the audio signature analyzer 228, and/or the video signature analyzer 230 in any order or combination. The interrupt identifier 224 of the illustrated example outputs data pertaining to detected interrupts (e.g., start times, end times, content identification during the interrupts, etc.) to the interrupt report generator 236.

The watermark analyzer 226 of the illustrated example of FIG. 2 analyzes watermarks detected by the watermark detector 218 to detect affiliate interrupt periods. In some examples, the watermark analyzer 226 sequentially steps through an audio sample, determining whether network codes and/or local/affiliate codes were detected throughout the audio sample. In some examples, when the watermark detector 218 detects both a network code and a local code, the watermark analyzer 226 can determine that an affiliate interrupt is not occurring, as the media content includes the network code. In some examples, when the watermark detector 218 detects a local code without a network code, an affiliate interrupt can be determined to be occurring at that time, as the media includes only a local watermark without the network watermark. Network audiovisual signals which do not include a network watermark but do include a local watermark (thereby indicating they support watermark encoding) are indicative of an affiliate interrupt. As used herein, a local watermark is interchangeably referred to as a final distributor watermark and refers to a watermark embedded by an entity prior to final distribution of media. In some examples, when the watermark analyzer 226 does not detect a local code nor a network code, the watermark analyzer 226 may indicate that it cannot determine whether an affiliate interrupt occurred, as the media does not include watermarks at the time. In some such examples, the interrupt identifier 224 may cause the audio signature analyzer 228 and/or the video signature analyzer 230 to analyze the affiliate audiovisual signals 202 when the watermark analyzer 226 is unable to utilize watermarks to detect if an affiliate interrupt occurred.

In some examples, the watermark analyzer 226 may monitor a time since a last network watermark was detected (sometimes referred to herein as a "bridge time") to determine whether a watermark sample includes an affiliate interrupt. For example, if a network watermark is encoded every 2 seconds, the bridge time may be configured to be a multiple of this frequency. If the bridge time is configured at five-times the watermark frequency, the watermark analyzer 226 would determine an affiliate interrupt occurred when the network watermark has not been detected for ten seconds, during which local watermarks have been detected. The bridge time may be configured based on a known reliability and detectability of the network watermark. With a highly reliable network watermark, it would be unlikely that five-times the watermark frequency would occur without a network watermark being detected if network media is being presented. In some examples, the bridge time of the network watermark and the local watermark may be different (e.g., the local watermark may be encoded at a higher frequency than the network watermark, or vice-versa). In some examples, in response to both the bridge time of the network watermark and the bridge time of the local watermark having elapsed without detecting a watermark, the watermark analyzer 226 may determine that the content either is not encoded with watermarks or no media is being presented.

In some examples, the watermark analyzer 226 may detect affiliate interrupts based on different watermark formats. For example, the watermark detector 218 may detect a first watermark format including both local codes and network codes, as well as a second watermark format including both local codes and network codes. In such examples, the watermark analyzer 226 can leverage the local codes from both formats and the network codes from both formats to determine whether an affiliate interrupt has occurred. In some examples, the different formats (and the respective different codes in each format) may have different repetition frequencies, and consequently different bridge times. As previously discussed, the watermark analyzer 226 can determine an affiliate interrupt occurred for a time period in which the local codes were detected and the network codes were not (e.g., the local codes in one or both formats were detected but neither of the network codes from either format were detected, for at least the bridge times of both formats of network codes).

The example audio signature analyzer 228 of the illustrated example of FIG. 2 utilizes audio signatures accessed and/or generated by the audio signature generator 220 to detect affiliate interrupt periods. In some examples, when the reference audio signals 214 are available, the audio signature analyzer 228 compares signatures corresponding to the affiliate audio signals 210 with signatures corresponding to the reference audio signals 214 to detect affiliate interrupts. In some such examples, the audio signature analyzer 228 compares audio signatures corresponding to the same time from the reference audio signals 214 and the affiliate audio signals 210. The audio signature analyzer 228 can detect an interrupt period for durations during which the signatures corresponding to the reference audio signals 214 do not match signatures corresponding to the affiliate audio signals 210, if the durations satisfy an interrupt duration threshold. For example, the interrupt duration threshold may be configured to avoid identifying a local interrupt for very brief discrepancies (e.g., one second, two seconds, etc.), which may be either an error in the signature comparison or a brief discrepancy in the affiliate audio signal. The interrupt duration threshold can be configured to be equal to the minimum interrupt duration that would be of interest to a network.

In some examples, such as when the reference audio signals 214 are not available, the audio signature analyzer 228 may compare audio signatures corresponding to a group of the affiliate audio signals 210 associated with a respective group of the affiliate stations. In some examples, the audio signature analyzer 228 compares signatures corresponding to a group of the affiliate signals at a same time and determines whether the affiliate signals match at that time. In some such examples, the audio signature analyzer 228 may flag a time or a time segment as non-matching when signatures for the affiliate signals do not match at a time or for a time segment. In some such examples, the audio signature analyzer 228 may analyze the identified non-matching time segments to determine if (1) the non-matching time segment satisfies a difference threshold indicating the differences are substantial enough (e.g., the affiliate audio signals 210 are different enough) to represent an affiliate interrupt and/or (2) whether the non-matching time segment satisfies a duration threshold associated with the minimum detectable affiliate interrupt (e.g., a duration threshold configurable based on a network's preference or the AMEs preference for a minimum interrupt detection time). In some examples, if any one of the affiliate signals is non-matching to the remaining affiliate signals, this one of the affiliate signals is flagged as having an affiliate interrupt during the time segment.

In some examples, when a first group of the affiliate signals does not match a second group of the affiliate signals for a time segment, the smaller of the two groups may be identified as the affiliate interrupt. For example, if ten affiliate broadcasts corresponding to the same network correspond to the same media (based on signature matching) during a time period, and three affiliate broadcasts correspond to different media, the three affiliate broadcasts may be flagged as having an affiliate interrupt during the time segment. In some examples, if a similar number of affiliate broadcasts match with a similar number of other ones of a plurality of broadcasts (e.g., out of twelve broadcasts, five match to each other and seven match to each other), the audio signature analyzer 228 may perform further analysis (e.g., such as attempting to compare one of the affiliate broadcasts with a network signal) to determine which grouping of affiliate broadcasts corresponds to the network audio-visual signals 204 and which corresponds to an affiliate interrupt.

In some examples, the audio signature analyzer 228 determines a first number of the affiliate signals that correspond to the largest group of matching affiliate signals. For example, the audio signature analyzer 228 may determine that there are six affiliate signals that match each other, another three affiliate signals that match each other (based on audio signature comparison), and four individual signals that do not match any other signal. In such an example, the audio signature analyzer 228 would determine that the largest group of matching affiliate signals includes eight affiliate signals. In some examples, the audio signature analyzer 228 determines whether the number of matching affiliate signals in the largest group satisfies a threshold associated with a minimum number of matching signals to determine an affiliate interrupt is not occurring. For example, if twenty affiliate signals are being analyzed, the threshold may be set to twelve affiliate signals, meaning that if less than twelve affiliate signals are in the largest group (e.g., are matching), the audio signature analyzer 228 can identify an affiliate interrupt, since there are numerous signals that are presenting different media. In such an example, the audio signature analyzer 228 may identify the signals that are not in the largest group as experiencing affiliate interrupts.

The example video signature analyzer 230 of the illustrated example of FIG. 2 detects affiliate interrupts based on video signatures generated and/or accessed by the video signature generator 222. In some examples, the video signature analyzer 230 compares video signatures from an affiliate signal and a reference signal, while in other examples the video signature analyzer 230 compares video signatures from two different affiliate signals. In some examples, the video signature analyzer 230 accesses a buffer of the video signatures from the reference video signals 216 to compare to signatures corresponding to the one or more of the affiliate video signals. The video signature analyzer 230 of the illustrated example includes the example alignment analyzer 232 and the example video signature comparator 234.

The example alignment analyzer 232 of the illustrated example of FIG. 2 performs alignment of the video signatures of the two signals being compared. In some examples, due to different encoding or other factors, there may be an offset in time between the video signatures from the affiliate signal and the video signatures from the reference signal. The alignment analyzer 232 can search the video signatures for strong matches between the affiliate signal and the reference signal and utilize these strong matches to shift the time-position of the signatures so that the signatures being compared correspond to the same times in the media presentation. Once the alignment analyzer 232 has aligned the signatures of the two signals being compared, the video signature comparator 234 can initiate the comparison process.

The example video signature comparator 234 of the illustrated example of FIG. 2 compares video signatures at corresponding times to detect affiliate interrupts. In some examples, the video signature comparator 234 calculates difference values between corresponding video signatures and compares these difference values to a difference threshold. If the difference value for a comparison exceeds the difference threshold, and there are a quantity of temporally adjacent video signatures that also exceed the threshold, sufficient to satisfy an interrupt duration threshold, the video signature comparator 234 may identify an affiliate interrupt. For example, the video signature comparator 234 may first identify all corresponding signatures (e.g., sets of signatures which are aligned in time) which exceed the difference threshold, and then determine whether any of these corresponding signatures exceeding the difference threshold are adjacent in time and satisfy the interrupt duration threshold. Finally, the video signature comparator 234 identifies interrupt periods based on the first of the temporally adjacent samples which exceeds the difference threshold and extending until the last of the temporally adjacent samples exceeding the difference threshold.

In some examples, if there is existing knowledge of time periods that may correspond to affiliate interrupts (e.g., based on affiliate interrupt detection from the watermark analyzer 226 and/or audio signature analyzer 228), the video signature comparator may focus on these time periods to more accurately define the start and end times of the affiliate interrupts based on video signature comparison. For example, due to the different characteristics represented in a video signature comparison (e.g., colors of specific pixels), the time at which local interrupts began and concluded may be determined with higher accuracy than may be determined based on watermarks and/or audio signatures alone. In such examples where the video signature analyzer 230 has existing knowledge of time periods that may correspond to affiliate interrupts, the video signature analyzer 230 may analyze corresponding video signatures to extend or reduce the start and end times of the interrupt period based on whether the video signatures match at times around the boundaries of the affiliate interrupt time periods. For example, if the video signature analyzer 230 is informed that an affiliate interrupt began at 04:23 in the affiliate video signal (based on a determination from the watermark analyzer 226 and/or the audio signature analyzer 228), the video signature analyzer 230 can compare video signatures for the affiliate signal with video signatures for the reference signal at times around 04:23 to determine specifically when the affiliate interrupt began. The video signature analyzer 230 can perform similar analysis to refine the end time of the affiliate interrupt based on video signature comparison.

The example interrupt report generator 236 of the illustrated example of FIG. 2 generates interrupt report data. In some examples, the interrupt report generator 236 accesses affiliate interrupt periods determined by the interrupt identifier 242, and aggregates data corresponding to the interrupt periods into a report for a network. For example, the interrupt report data 120 may include a number of affiliate interrupts that occurred during a time period (e.g., a day, a week, etc.), specific start and end times of the affiliate interrupts, durations of the affiliate interrupts, indications of whether the affiliate interrupts were expected, etc. For example, the interrupt report generator 236 may include an indication of whether the affiliate interrupt was expected based on whether the time periods reported from the interrupt identifier correspond to known time periods for commercial pods (e.g., as determined based on cue tones, indications from a network, etc.).

While an example manner of implementing the affiliate interrupt analyzer 118 of FIG. 1 is illustrated in FIG. 2, one or more of the elements, processes and/or devices illustrated in FIG. 2 may be combined, divided, re-arranged, omitted, eliminated and/or implemented in any other way. Further, the example affiliate signal receiver 206, the example reference signal receiver 208, the example watermark detector 218, the example audio signature generator 220, the example video signature generator 222, the example interrupt identifier 224, the example watermark analyzer 226, the example audio signature analyzer 228, the example video signature analyzer 230, the example alignment analyzer 232, the example video signature comparator 234, the example interrupt report generator 236 and/or, more generally, the example affiliate interrupt analyzer 118 of FIG. 2 may be implemented by hardware, software, firmware and/or any combination of hardware, software and/or firmware. Thus, for example, any of the example affiliate signal receiver 206, the example reference signal receiver 208, the example watermark detector 218, the example audio signature generator 220, the example video signature generator 222, the example interrupt identifier 224, the example watermark analyzer 226, the example audio signature analyzer 228, the example video signature analyzer 230, the example alignment analyzer 232, the example video signature comparator 234, the example interrupt report generator 236 and/or, more generally, the example affiliate interrupt analyzer 118 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example affiliate signal receiver 206, the example reference signal receiver 208, the example watermark detector 218, the example audio signature generator 220, the example video signature generator 222, the example interrupt identifier 224, the example watermark analyzer 226, the example audio signature analyzer 228, the example video signature analyzer 230, the example alignment analyzer 232, the example video signature comparator 234, or the example interrupt report generator 236 is/are hereby expressly defined to include a non-transitory computer readable storage device or storage disk such as a memory, a digital versatile disk (DVD), a compact disk (CD), a Blu-ray disk, etc. including the software and/or firmware. Further still, the example affiliate interrupt analyzer 118 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the affiliate interrupt analyzer 118 of FIG. 2 are shown in FIGS. 3-7B. The machine readable instructions may be one or more executable programs or portion(s) of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 3-7B, many other methods of implementing the example affiliate interrupt analyzer 118 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 3-7B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 3:
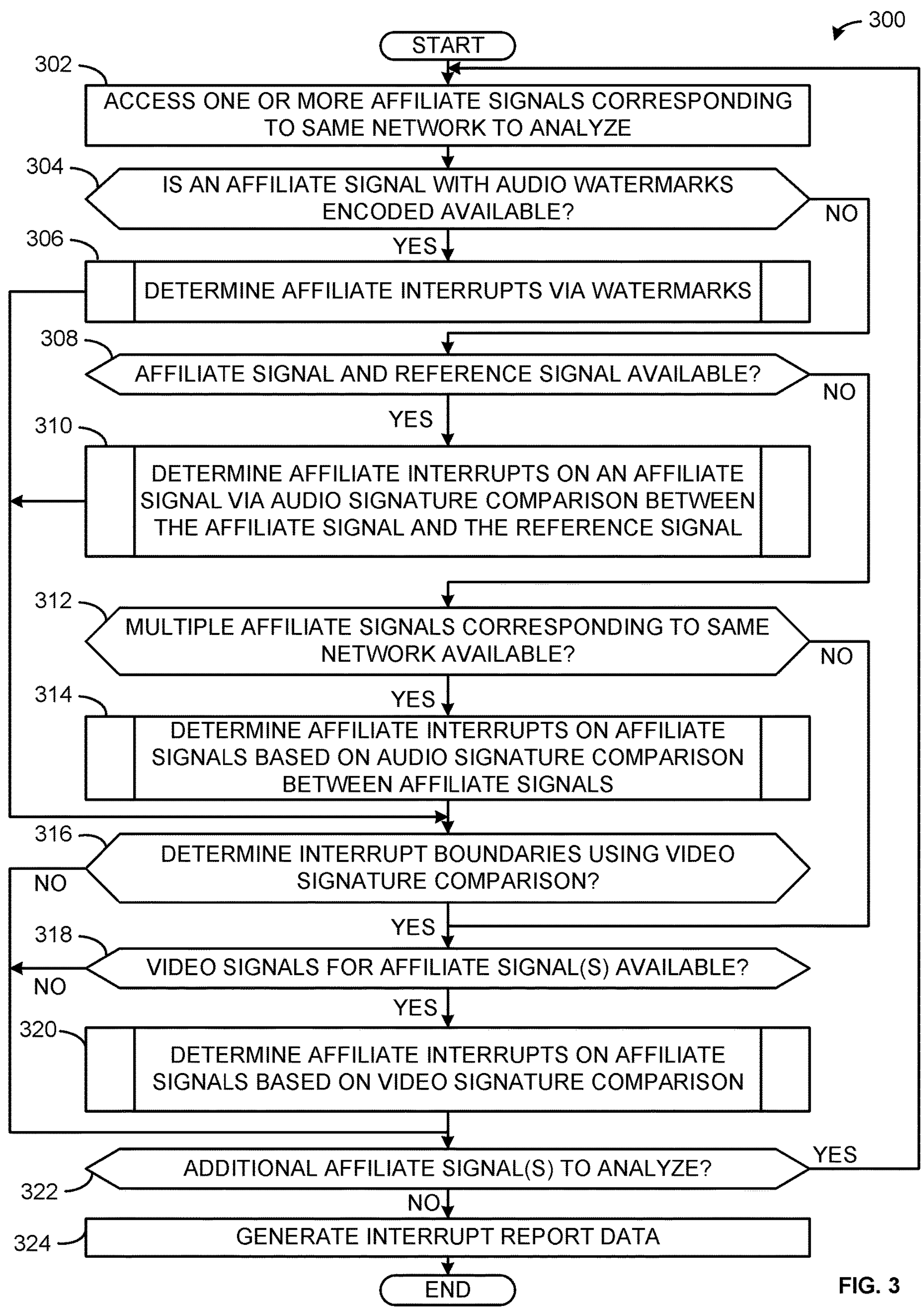
FIG. 3 is a flowchart representative of example machine readable instructions that may be executed to implement the affiliate interrupt analyzer of FIGS. 1 and/or 2 to perform affiliate interrupt detection.

Example machine readable instructions 300 that may be executed by the affiliate interrupt analyzer 118 of FIGS. 1 and/or 2 to perform affiliate interrupt detection are illustrated in FIG. 3. With reference to the preceding figures and associated descriptions, the example machine readable instructions 300 of FIG. 3 begin with the affiliate interrupt analyzer 118 accessing one or more affiliate signals corresponding to a same network broadcaster to analyze (Block 302). In some examples, the affiliate signal receiver 206 accesses one or more affiliate signals corresponding to a same network broadcaster to analyze.

At block 304, the example affiliate interrupt analyzer 118 determines if an affiliate signal with audio watermarks encoded is available. In some examples, the watermark detector 218 determines whether one or more of the accessed affiliate signals includes embedded watermarks. In response to determining that an affiliate signal with audio watermarks encoded is available, processing transfers to block 306. Conversely, in response to determining that an affiliate signal with audio watermarks encoded is not available, processing transfers to block 308.

At block 306, the example affiliate interrupt analyzer 118 determines affiliate interrupts via watermarks. In some examples, the interrupt identifier 224 determines affiliate interrupts via watermarks. In some examples, the watermark analyzer 226 determines affiliate interrupts via watermarks. Example instructions for determining affiliate interrupts via watermarks are disclosed in connection with FIG. 4.

At block 308, the example affiliate interrupt analyzer 118 determines whether an affiliate signal and a reference signal is available. In some examples, the affiliate signal receiver 206 determines if an affiliate signal is available, and the reference signal receiver 208 determines if a corresponding reference signal is available. For example, the reference signal may be a network signal for a network corresponding to an affiliate signal received. In some examples, determining if the affiliate signal and the reference signal are available includes determining whether a network signal and an affiliate signal correspond to the same network. In response to determining that an affiliate signal and a reference signal is available, processing transfers to block 310. Conversely, in response to not determining an affiliate signal and a reference signal are available, processing transfers to block 312.

At block 310, the example affiliate interrupt analyzer 118 determines affiliate interrupts on an affiliate signal via audio signature comparison between the affiliate signal and the reference signal. In some examples, the interrupt identifier 224 determines affiliate interrupts on an affiliate signal via audio signature comparison between the affiliate signal and the reference signal. In some examples, the audio signature analyzer 228 determines affiliate interrupts on an affiliate signal via audio signature comparison between the affiliate signal and the reference signal. Example instructions for determining affiliate interrupts on an affiliate signal via audio signature comparison between the affiliate signal and the reference signal are disclosed in connection with FIG. 5.

At block 312, the example affiliate interrupt analyzer 118 determines if multiple affiliate signals corresponding to a same network are available. In some examples, the affiliate signal receiver 206 determines if multiple affiliate signals corresponding to the same network are available. In response to multiple affiliate signals corresponding to a same network being available, processing transfers to block 314. Conversely, in response to multiple affiliate signals corresponding to a same network not being available, processing transfers to block 318.

At block 314, the example affiliate interrupt analyzer 118 determines affiliate interrupts on affiliate signals based on audio signature comparison between affiliate signals. In some examples, the interrupt identifier 224 determines affiliate interrupts on affiliate signals based on audio signature comparison between affiliate signals. In some examples, the audio signature analyzer 228 determines affiliate interrupts on affiliate signals based on audio signature comparison between affiliate signals. Example instructions for determining affiliate interrupts on affiliate signals based on audio signature comparison between affiliate signals are disclosed in connection with FIG. 6.

At block 316, the example affiliate interrupt analyzer 118 decides whether to determine interrupt boundaries using video signature comparison. In some examples, the interrupt identifier 224 decides whether to determine interrupt boundaries using video signature comparison. In response to determining interrupt boundaries using video signature comparison, processing transfers to block 318. Conversely, in response to not determining interrupt boundaries using video signature comparison, processing transfers to block 322.

At block 318, the example affiliate interrupt analyzer 118 determines whether video signals for affiliate signal(s) are available. In some examples, the video signature generator 222 determines whether video signals for the affiliate signals are available. In response to video signals for the affiliate signals being available, processing transfers to block 320. Conversely, in response to video signals for the affiliate signals not being available, processing transfers to block 322.

At block 320, the example affiliate interrupt analyzer 118 determines affiliate interrupts on affiliate signals based on video signature comparison. In some examples, the interrupt identifier determines affiliate interrupts on affiliate signals based on video signature comparison. In some examples, the video signature analyzer 230 determines affiliate interrupts on affiliate signals based on video signature comparison. Example instructions for determining affiliate interrupts on affiliate signals based on video signature comparison are disclosed in FIGS. 7A-7B.

At block 322, the example affiliate interrupt analyzer 118 determines whether there are additional affiliate signal(s) to analyze. In some examples, the affiliate signal receiver 206 determines whether there are additional affiliate signal(s) to analyze. In response to there being additional affiliate signals to analyze, processing transfers to block 302. Conversely, in response to there not being additional affiliate signals to analyze, processing transfers to block 324.

At block 324, the example affiliate interrupt analyzer 118 generates interrupt report data. In some examples, the interrupt report generator 236 generates interrupt report data.

Figure 4:
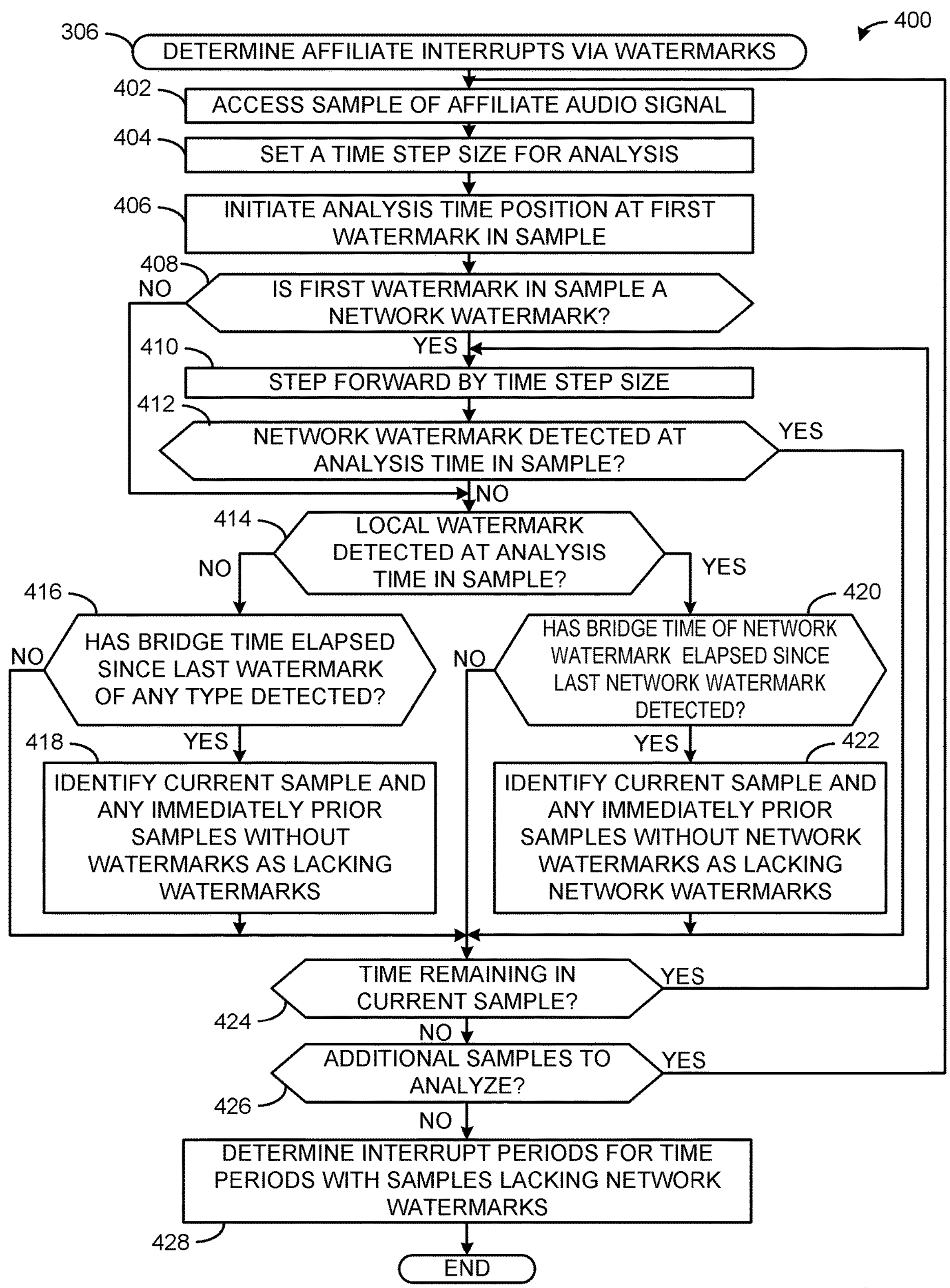
FIG. 4 is a flowchart representative of example machine readable instructions that may be executed to implement the affiliate interrupt analyzer of FIGS. 1 and/or 2 to determine local media interrupts via watermarks.

Example machine readable instructions 400 that may be executed by the affiliate interrupt analyzer 118 of FIGS. 1 and/or 2 to determine local media interrupts via watermarks are illustrated in FIG. 4. With reference to the preceding figures and associated descriptions, the example machine readable instructions 400 of FIG. 4 begin with the affiliate interrupt analyzer 118 accessing a sample of an affiliate audio signal (Block 402). In some examples, the watermark analyzer 226 accesses a sample of the affiliate audio signal.

At block 404, the example affiliate interrupt analyzer 118 sets a time step size for analysis. In some examples, the watermark analyzer 226 sets a time step size for analysis. For example, the watermark analyzer 226 can analyze segments that are one second in duration, two seconds in duration, etc.

At block 406, the example affiliate interrupt analyzer 118 initiates an analysis time position at a first watermark in the sample. In some examples, the watermark analyzer 226 initiates the analysis time position at the first watermark in the sample of the affiliate audio signal.

At block 408, the example affiliate interrupt analyzer 118 determines if the first watermark in the sample is a network watermark. In some examples, the watermark analyzer 226 determines if the first watermark in the sample is a network watermark. For example, the watermark analyzer 226 may determine if the first watermark is a network watermark based on a length of the first watermark, based on a format of the first watermark, based on data that can be decoded from the first watermark, and/or based on any other technique. In response to the first watermark in the sample being a network watermark, processing transfers to block 410. Conversely, in response to the first watermark in the sample not being a network watermark, processing transfers to block 414.

At block 410, the example affiliate interrupt analyzer 118 steps the time position forward by the time step size. In some examples, the watermark analyzer 226 steps the analysis time position forward by the time step size.

At block 412, the example affiliate interrupt analyzer 118 determines, as at block 408, if a network watermark was detected at the analysis time in the sample. In some examples, the watermark analyzer 226 determines, as at block 408, if the network watermark was detected at the analysis time in the sample. In response to the network watermark being detected at the analysis time in the sample, processing transfers to block 424. Conversely, in response to the network watermark not being detected at the analysis time in the sample, processing transfers to block 414.

At block 414, the example affiliate interrupt analyzer 118 determines if a local watermark is detected at the analysis time in the sample. In some examples, the watermark analyzer 226 determines if a local watermark is detected at the analysis time in the sample. For example, the watermark analyzer 226 may determine if the first watermark is a local watermark based on a length of the first watermark, based on a format of the first watermark, based on data that can be decoded from the first watermark, and/or based on any other technique. In response to a local watermark being detected at the analysis time in the sample, processing transfers to block 420. Conversely, in response to the local watermark not being detected at the analysis time in the sample, processing transfers to block 416.

At block 416, the example affiliate interrupt analyzer 118 determines if a bridge time has elapsed since the last watermark of any type (e.g., a network watermark/code or a local watermark/code) was detected. In some examples, the watermark analyzer 226 determines if the bridge time has elapsed since the last watermark of any type was detected. In response to the bridge time having elapsed since the last watermark of any type was detected, processing transfers to block 418. Conversely, in response to the bridge time not having elapsed since the last watermark of any type was detected, processing transfers to block 424.

At block 418, the example affiliate interrupt analyzer 118 identifies the current sample and any immediately prior samples without watermarks as lacking watermarks. In some examples, the watermark analyzer 226 identifies the current sample and any immediately prior samples without watermarks as lacking watermarks. Such samples without watermarks may correspond to media that is not encoded with watermarks, or a lack of media represented in the affiliate signal, for example.

At block 420, the example affiliate interrupt analyzer 118 determines if a bridge time of the network watermark has elapsed since the last network watermark was detected. In some examples, the watermark analyzer 226 determines if the bridge time of the network watermark has elapsed since the last network watermark was detected. In response to the bridge time of the network watermark having elapsed since the last network watermark was detected, processing transfers to block 420. Conversely, in response to the bridge time of the network watermark not having elapsed since the last network watermark was detected, processing transfers to block 424.

At block 422, the example affiliate interrupt analyzer 118 identifies the current sample and any immediately prior samples without network watermarks as lacking network watermarks. In some examples, the watermark analyzer 226 identifies the current sample and any immediately prior samples without network watermarks as lacking network watermarks.

At block 424, the example affiliate interrupt analyzer 118 determines if there is time remaining in the current sample of the affiliate audio signal being processed. In some examples, the watermark analyzer 226 determines if there is time remaining in the current sample. In response to there being time remaining in the current sample, processing transfers to block 410. Conversely, in response to there not being time remaining in the current sample, processing transfers to block 426.

At block 426, the example affiliate interrupt analyzer 118 determines if there are additional samples of the affiliate audio signal to analyze. In some examples, the watermark analyzer 226 determines if there are additional samples to analyze. In response to there being additional samples to analyze, processing transfers to block 402. Conversely, in response to there not being any additional samples to analyze, processing transfers to block 428.

At block 428, the example affiliate interrupt analyzer 118 determines interrupt periods for time periods of the affiliate audio signal corresponding to samples lacking network watermarks. In some examples, the example watermark analyzer 226 determines interrupt periods for the samples identified as lacking network watermarks (e.g., at block 422).

Figure 5:
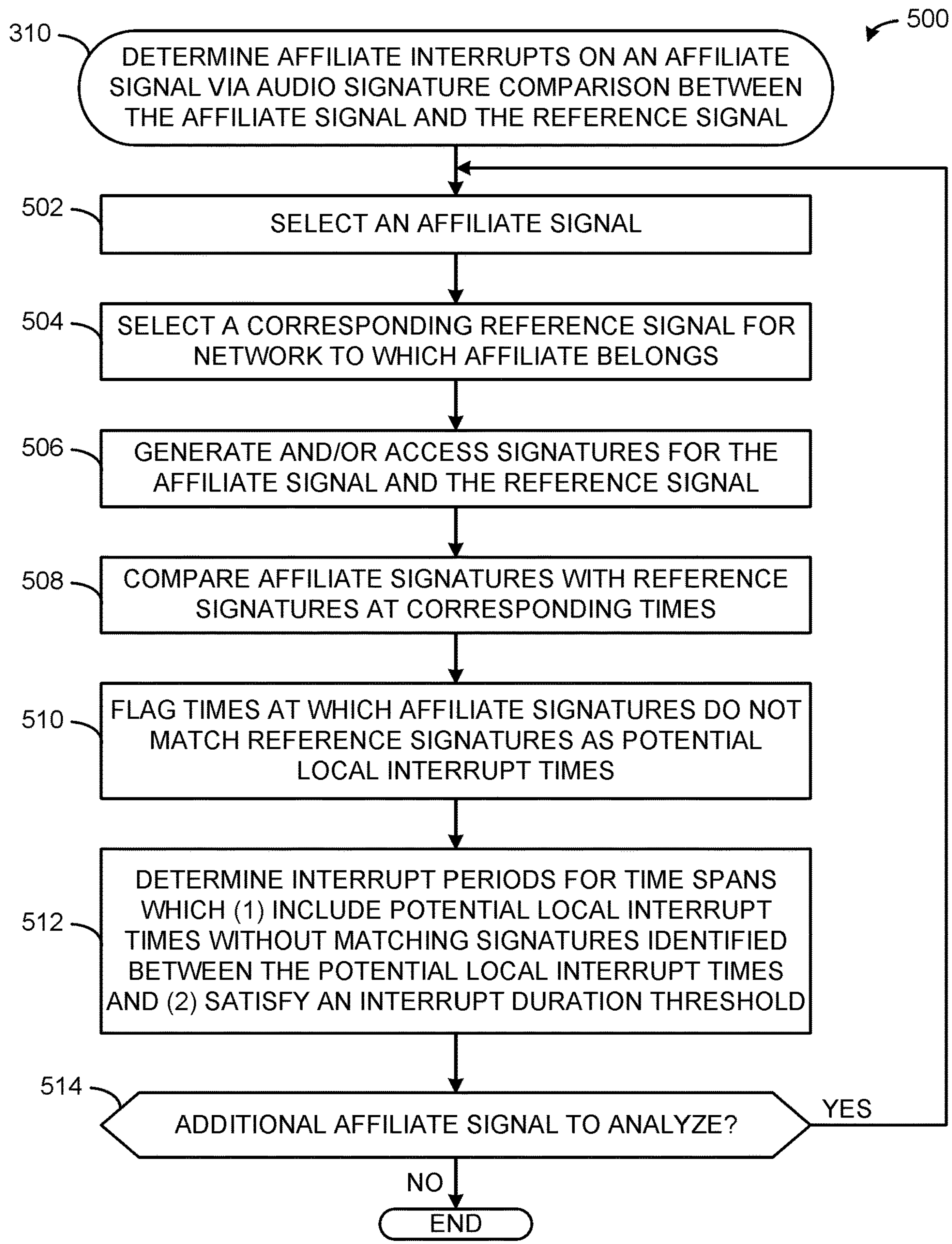
FIG. 5 is a flowchart representative of example machine readable instructions that may be executed to implement the affiliate interrupt analyzer of FIGS. 1 and/or 2 to determine local media interrupts on an affiliate signal via audio signature comparison between the affiliate signal and the reference signal.

Example machine readable instructions 500 that may be executed by the affiliate interrupt analyzer 118 of FIGS. 1 and/or 2 to determine local media interrupts on an affiliate signal via audio signature comparison between the affiliate signal and the reference signal are illustrated in FIG. 5. With reference to the preceding figures and associated descriptions, the example machine readable instructions 500 of FIG. 5 begin with the affiliate interrupt analyzer 118 selecting an affiliate signal (Block 502). In some examples, audio signature analyzer 228 selects an affiliate signal.

At block 504, the example affiliate interrupt analyzer 118 selects a corresponding reference signal for the network to which the affiliate belongs. In some examples, the audio signature analyzer 228 selects a corresponding reference signal for the network to which the affiliate belongs.

At block 506, the example affiliate interrupt analyzer 118 generates and/or accesses signatures for the affiliate signal and the reference signal. In some examples, the audio signature generator 220 generates audio signatures for the affiliate signal and/or the reference signal. In some examples, the audio signature analyzer 228 accesses signatures for the affiliate signal and/or the reference signal from the audio signature generator 220 and/or from another location (e.g., the signatures may be generated at another component of the AME 114, or at another external location).

At block 508, the example affiliate interrupt analyzer 118 compares affiliate signatures with reference signatures at corresponding times. In some examples, the audio signature analyzer 228 compares the affiliate signatures with the reference signatures at corresponding times.

At block 510, the example affiliate interrupt analyzer 118 flags times at which the affiliate signatures do not match the reference signatures as potential local interrupt times. In some examples, the audio signature analyzer 228 flags times at which the affiliates do not match the reference signatures as potential local interrupt times.

At block 512, the example affiliate interrupt analyzer 118 determines interrupt periods for time spans which (1) include potential local interrupt times without matching signatures identified between the local interrupt times and (2) satisfy an interrupt duration threshold. In some examples, the audio signature analyzer 228 determines interrupt periods for time spans which (1) include potential local interrupt times without matching signatures identified between the local interrupt times and (2) satisfy an interrupt duration threshold. In some examples, the audio signature analyzer 228 first identifies groupings of potential local interrupt times (e.g., indications of potential local interrupts without matching signatures found between the indications), and compares the durations of these groupings to the interrupt duration threshold. In response to identifying time periods in which matching signatures were not identified, and which exceed the interrupt duration threshold, an affiliate interrupt period is identified.

At block 514, the example affiliate interrupt analyzer 118 determines whether there are additional affiliate signals to analyze. In response to there being an additional affiliate signal to analyze, processing transfers to block 502. Conversely, in response to there not being additional affiliate signals to analyze, processing terminates.

Figure 6:
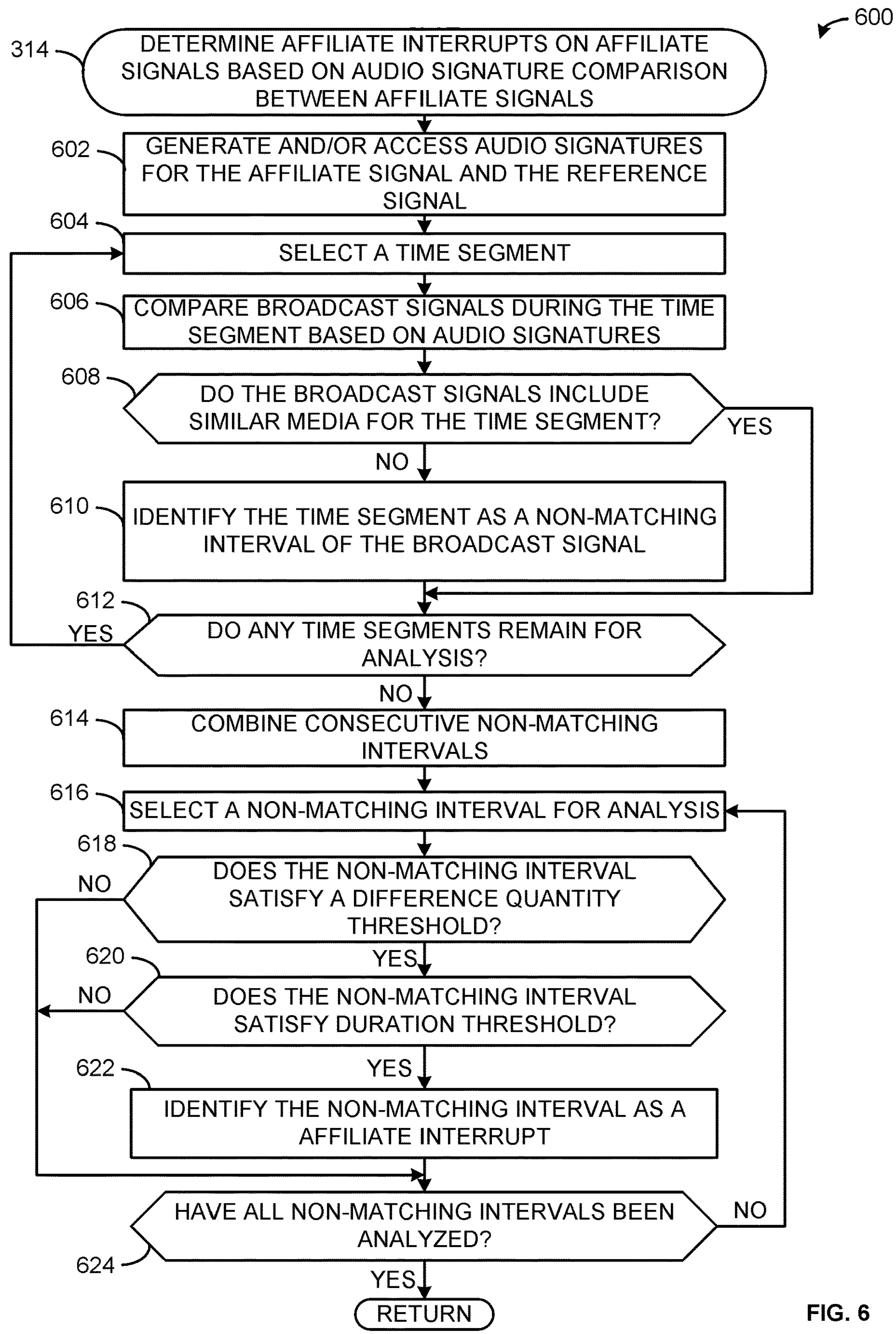
FIG. 6 is a flowchart representative of example machine readable instructions that may be executed to implement the affiliate interrupt analyzer of FIGS. 1 and/or 2 to determine local media interrupts on affiliate signals based on audio signature comparison on affiliate signals.

Example machine readable instructions 600 that may be executed by the affiliate interrupt analyzer 118 of FIGS. 1 and/or 2 to determine local media interrupts on affiliate signals based on audio signature comparison on affiliate signals are illustrated in FIG. 6. With reference to the preceding figures and associated descriptions, the example machine readable instructions 600 of FIG. 6 begin with the affiliate interrupt analyzer 118 generating and/or accessing audio signatures for the affiliate signal and the reference signal (Block 602). In some examples, the audio signature generator 220 generates audio signatures for the affiliate signal and/or the reference signal, and/or the audio signature analyzer 228 accesses audio signatures for the affiliate signal and/or the reference signal.

At block 604, the example affiliate interrupt analyzer 118 selects a time segment. In some examples, the audio signature analyzer 228 selects a time segment.

At block 606, the example affiliate interrupt analyzer 118 compares broadcast signals during the time segment based on audio signatures. In some examples, the audio signature analyzer 228 compares broadcast signals during the time segment based on audio signatures.

At block 608, the example affiliate interrupt analyzer 118 determines if the broadcast signals include similar media for the time segment. In some examples, the audio signature analyzer 228 determines if the broadcast signals include similar media for the time segment. For example, the audio signature analyzer 228 can determine whether audio signatures match during the time segment (e.g. match within a specific threshold difference quantity). In response to the broadcast signals including similar media for the time segment, processing transfers to block 612. Conversely, in response to the broadcast signals not including similar media for the time segment, processing transfers to block 610.

At block 610, the example affiliate interrupt analyzer 118 identifies the time segment as a non-matching interval of the broadcast signal. In some examples, the example audio signature analyzer 228 identifies the time segment as a non-matching interval of the broadcast signal.

At block 612, the example affiliate interrupt analyzer 118 determines whether any time segments of the affiliate broadcast signals remain for analysis. In some examples, the audio signature analyzer 228 determines whether any time segments remain for analysis. In response to there being time segments remaining for analysis, processing transfers to block 604. Conversely, in response to there not being time segments remaining for analysis, processing transfers to block 614.

At block 614, the example affiliate interrupt analyzer 118 combines consecutive non-matching intervals to determine aggregate non-matching intervals. In some examples, the audio signature analyzer 228 combines consecutive non-matching intervals (e.g., identified non-matching intervals with no matching intervals in between them) to determine an aggregate non-matching interval corresponding to the group of consecutive non-matching intervals.

At block 616, the example affiliate interrupt analyzer 118 selects an aggregate non-matching interval for analysis. In some examples, the audio signature analyzer 228 selects an aggregate non-matching interval for analysis.

At block 618, the example affiliate interrupt analyzer 118 determines if the aggregate non-matching interval satisfies a difference threshold. In some examples, the audio signature analyzer 228 determines if the aggregate non-matching interval satisfies a difference quantity threshold. For example, the difference quantity threshold may correspond to an amount difference (e.g., a percentage of difference) between signatures of the affiliate signal and the reference signal. In response to satisfying a difference quantity threshold, processing transfers to block 620. Conversely, in response to not satisfying a difference quantity threshold, processing transfers to block 624.

At block 620, the example affiliate interrupt analyzer 118 determines whether the aggregate non-matching interval satisfies a duration threshold. In some examples, the audio signature analyzer 228 determines whether the aggregate non-matching interval satisfies the duration threshold. In some examples, the duration threshold is configured as the minimum duration to be associated with an affiliate interrupt. For example, in some examples, if an interrupt is less than a second, this may be too brief to determine that an affiliate interrupt occurred (e.g., there may have been a brief irregularity in one of the signals, there may have been an irregularity in signatures generated based on one of the signals, etc.). In response to the aggregate non-matching interval satisfying the duration threshold, processing transfers to block 622. Conversely, in response to the non-matching interval not satisfying the duration threshold, processing transfers to block 624.

At block 622, the example affiliate interrupt analyzer 118 identifies the aggregate non-matching interval as an affiliate interrupt. In some examples, the audio signature analyzer 228 identifies the non-matching interval as an affiliate interrupt.

At block 624, the example affiliate interrupt analyzer 118 determines if all of the aggregate non-matching intervals have been analyzed. In some examples, the audio signature analyzer 228 determines if all of the aggregate non-matching intervals have been analyzed. In response to not all of the aggregate non-matching intervals having been analyzed, processing transfers to block 616. Conversely, in response to all of the aggregate non-matching intervals having been analyzed, processing returns to the machine readable instructions 300 of FIG. 3 and proceeds to block 316.

Figure 7A:
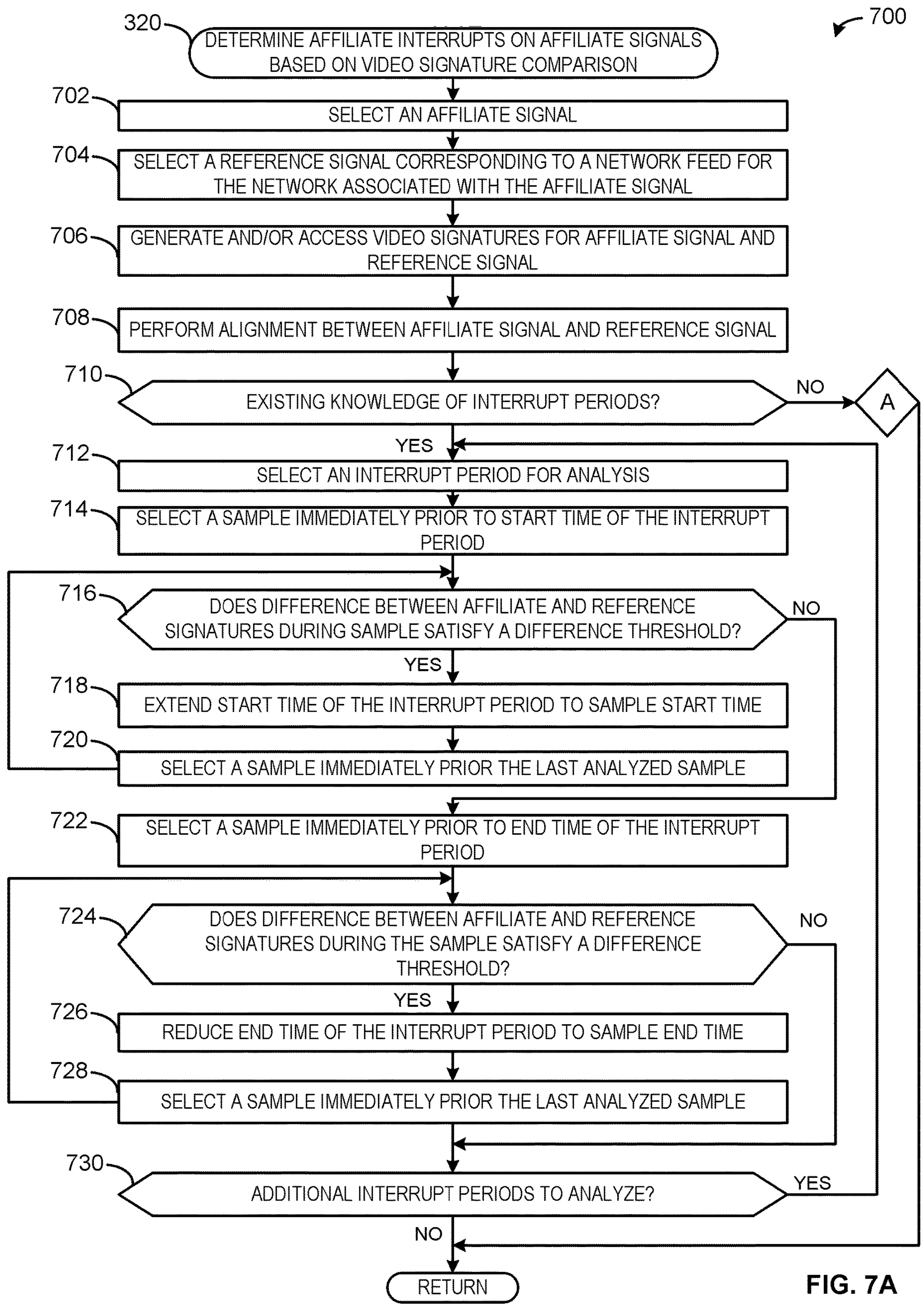
FIGS. 7A-7B collectively depict a flowchart representative of example machine readable instructions that may be executed to implement the affiliate interrupt analyzer of FIGS. 1 and/or 2 to determine local media interrupts on affiliate signals based on video signature comparison.
Figure 7B:
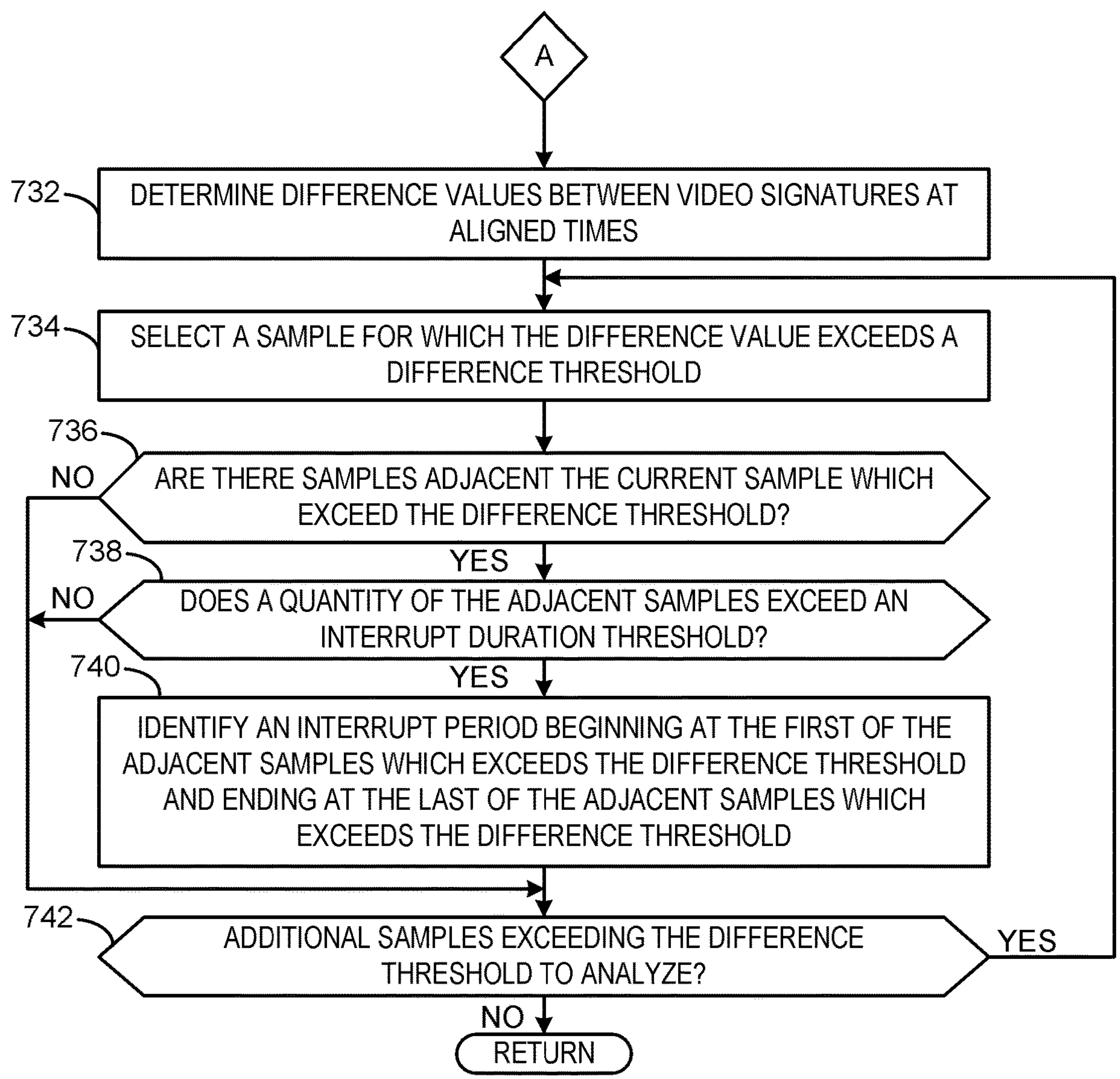

Example machine readable instructions 700 that may be executed by the affiliate interrupt analyzer 118 of FIGS. 1 and/or 2 to determine affiliate interrupts on affiliate signals based on video signature comparison are illustrated in FIGS. 7A-7B. With reference to the preceding figures and associated descriptions, the example machine readable instructions 700 of FIGS. 7A-7B begin with the affiliate interrupt analyzer 118 selecting an affiliate signal (Block 702). In some examples, the video signature generator 222 selects an affiliate signal.

At block 704, the example affiliate interrupt analyzer 118 selects a reference signal corresponding to a network feed for the network associated with the affiliate signal. In some examples, the video signature generator 222 selects a reference signal corresponding to a network feed for the network associated with the affiliate signal based on reference signals received at the reference signal receiver 208.

At block 706, the example affiliate interrupt analyzer 118 generates and/or accesses video signatures for the affiliate signal and the reference signal. In some examples, the video signature generator 222 generates and/or accesses video signatures for the affiliate signal and the reference signal. In some examples, the video signature generator 222 accesses video signatures generated at a separate device (e.g., at another component of the AME 114).

At block 708, the example affiliate interrupt analyzer 118 performs alignment between the affiliate signal and the reference signal. In some examples, the alignment analyzer 232 performs alignment between the affiliate signal and the reference signal. For example, the alignment analyzer 232 can attempt to align the affiliate signal and the reference signal in time by identifying matching video signatures and determining a time difference between the times of the matching signatures. For example, if a video signature or series of video signatures (e.g., consecutive video signatures) associated with the affiliate signal match video signatures of a reference signal with a one second offset (e.g., a first video signature associated with the affiliate signal at 43:30 matches a second video signature associated with the reference signal at 43:29), the alignment analyzer 232 can adjust the timing of one of the signals such that the matching video signatures have the same time, and thus the video signature comparator 234 can compare video signatures from each signal that have the same time value.

At block 710, the example affiliate interrupt analyzer 118 determines whether knowledge of interrupt periods is available. In some examples, the video signature analyzer 230 determines whether knowledge of interrupt periods is available. For example, if affiliate interrupts were already identified via watermarks and/or via audio signature comparison, then the affiliate interrupt analyzer 118 may utilize the video signature analyzer 230 to further refine boundaries corresponding to the affiliate interrupt periods. In response to knowledge of the interrupt periods being available, processing transfers to block 712. Conversely, in response to knowledge of the interrupt periods not being available, processing transfers to block 732 of FIG. 7B.

At block 712, the example affiliate interrupt analyzer 118 selects an interrupt period for analysis. In some examples, the video signature analyzer 230 selects an interrupt period for analysis. In some examples, the video signature comparator 234 selects an interrupt period for analysis.

At block 714, the example affiliate interrupt analyzer 118 selects a sample immediately prior to the start time of the selected interrupt period. In some examples, the video signature comparator 234 selects a sample immediately prior to the start time of the selected interrupt period.

At block 716, the example affiliate interrupt analyzer 118 determines whether a difference between the affiliate signatures and the reference signatures during the sample satisfies a difference threshold. In some examples, the video signature comparator 234 determines whether a difference between the affiliate signatures and the reference signatures during the sample satisfies the difference threshold. In response to the difference between the affiliate signatures and the reference signatures satisfying the difference threshold, processing transfers to block 718. Conversely, in response to the difference between the affiliate signatures and the reference signatures not satisfying the difference threshold, processing transfers to block 722.

At block 718, the example affiliate interrupt analyzer 118 extends a start time of the interrupt period to a sample start time. In some examples, the interrupt identifier 224 extends the start time of the interrupt period to the sample start time. In some examples, the video signature analyzer 230 extends the start time of the interrupt period to the sample start time.

At block 720, the example affiliate interrupt analyzer 118 selects a sample immediately prior to the last analyzed sample. In some examples, the interrupt identifier 224 (e.g., via the video signature analyzer 230) selects a sample immediately prior to the last analyzed sample.

At block 722, the example affiliate interrupt analyzer 118 selects a sample immediately prior to the end time of the interrupt period. In some examples, the video signature analyzer 230 (e.g., via the video signature comparator 234) selects a sample immediately prior to the end time of the interrupt period.

At block 724, the example affiliate interrupt analyzer 118 determines whether the difference between affiliate and reference signatures during the sample satisfies a difference threshold. In some examples, the video signature comparator 234 whether the difference between affiliate and reference signatures during the sample satisfies a difference threshold. In response to the difference satisfying the difference threshold, processing transfers to block 726. Conversely, in response to the difference not satisfying the threshold, processing transfers to block 730.

At block 726, the example affiliate interrupt analyzer 118 reduces an end time of the interrupt period to the sample end time. In some examples, the video signature analyzer 230 reduces an end time of the interrupt period to the sample end time.

At block 728, the example affiliate interrupt analyzer 118 selects a sample immediately prior to the last analyzed sample. In some examples, the video signature analyzer 230 (e.g., via the video signature comparator 234) selects a sample immediately prior to the last analyzed sample.

At block 730, the example affiliate interrupt analyzer 118 determines whether there are additional interrupt periods to analyze. In response to there being additional interrupt periods to analyze, processing transfers to block 712. Conversely, in response to there not being additional interrupt periods to analyze, processing returns to the machine readable instructions 300 of FIG. 3 and proceeds to block 322.

At block 732, the example affiliate interrupt analyzer 118 determines difference values between video signatures at aligned times. In some examples, the video signature comparator 234 determines difference values between video signatures at aligned times.

At block 734, the example affiliate interrupt analyzer 118 selects a sample for which the difference value exceeds a difference value. In some examples, the video signature comparator 234 selects a sample for which the difference value exceeds a difference threshold.

At block 736, the example affiliate interrupt analyzer 118 determines whether there are samples adjacent for the current sample which exceed the difference threshold. In some examples, the video signature comparator 234 determines whether there are samples adjacent for the current sample which exceed the difference threshold. In response to there being samples adjacent the current samples which exceed the difference threshold, processing transfers to block 738. Conversely, in response to there not being samples adjacent the current sample which exceed the difference threshold, processing transfers to block 742.

At block 738, the example affiliate interrupt analyzer 118 determines if a quantity of the adjacent samples exceeds an interrupt duration threshold. In some examples, the video signature comparator 234 determines if a quantity of the adjacent samples exceeds an interrupt duration threshold. In response to determining a quantity of the adjacent samples exceeds the interrupt duration threshold, processing transfers to block 740. Conversely, in response to determining a quantity of the adjacent samples does not exceed the interrupt duration threshold, processing transfers to block 742.

At block 740, the example affiliate interrupt analyzer 118 identifies an interrupt period beginning at the first of the adjacent samples which exceeds the difference threshold and ending at the last of the adjacent samples which exceeds the difference threshold. The example video signature comparator 234 identifies an interrupt period beginning at the first of the adjacent samples which exceeds the difference threshold and ending at the last of the adjacent samples which exceeds the difference threshold.

At block 742, the example affiliate interrupt analyzer 118 determines whether there are additional samples exceeding the difference threshold to analyze. In response to there being additional samples exceeding the difference threshold to analyze, processing transfers to block 742. Conversely, in response to there not being additional samples exceeding the difference threshold to analyze, processing returns to the machine readable instructions 300 of FIG. 3 and proceeds to block 322.

Figure 8:
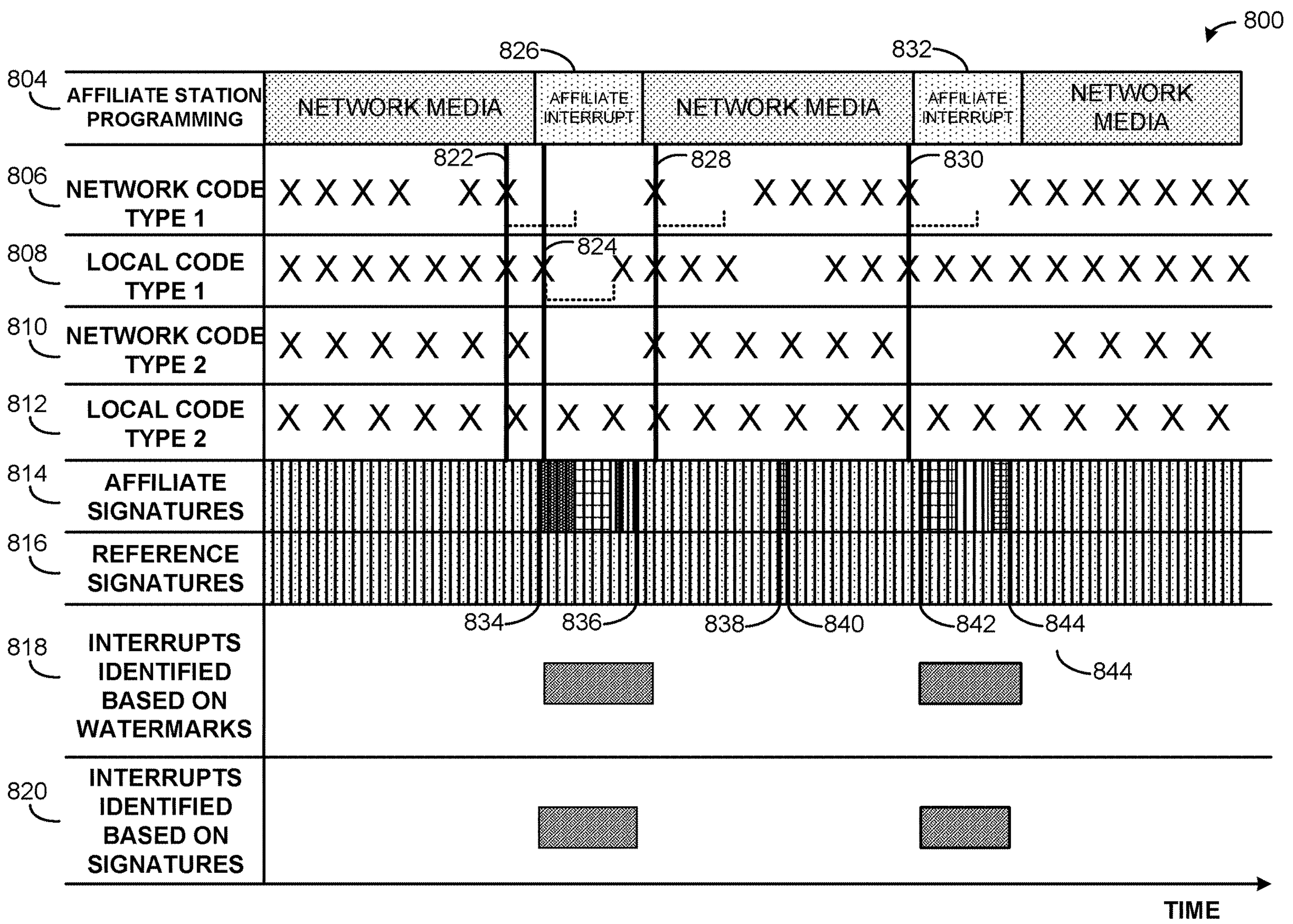
FIG. 8 is a schematic illustrating an example programming scenario and associated data to be utilized in accordance with techniques disclosed herein to detect affiliate interrupts.

FIG. 8 is a schematic 800 illustrating an example broadcast programming scenario and associated data to be utilized in accordance with techniques disclosed herein to detect affiliate interrupts.

The schematic 800 includes an example time axis 802, where time increases from left to right across the schematic 800, as viewed on the page.

The schematic 800 includes an example affiliate station programming indication row 804. The affiliate station programming indication row 804 illustrates a type of programming that was presented on an affiliate station at a particular time. At times when the affiliate station is directly presenting network media, the station programming indication row 804 illustrates "NETWORK MEDIA," whereas when an affiliate interrupt occurs (e.g., as detected by the affiliate interrupt analyzer 118), the affiliate station programming indication row 804 illustrates "AFFILIATE INTERRUPT."

The schematic 800 includes an example first type network code row 806 indicating detected network codes of a first type. The schematic 800 further includes an example first type of local code row 808 indicating detected local codes of the first type. For example, the first type of network codes and/or local codes may correspond to a specific encoding technique. Similarly, the schematic 800 includes an example second type of network code row 810 indicating detected network codes of a second time, and an example second type of local code row 812 indicating detected local codes of a second type.

The schematic 800 includes an example affiliate signatures row 814 indicating affiliate signatures that are generated based on the affiliate station programming throughout the affiliate station programming. The schematic 800 further includes an example reference signatures row 816 indicated signatures that are generated based on reference media (e.g., a direct feed of the national network). A first type of shading is utilized for the reference signatures and affiliate signatures which match the reference signatures, and other shadings are utilized to indicate affiliate signatures which do not match corresponding reference signatures.

The schematic 800 includes an example interrupts identified based on watermarks row 818 which indicates interrupt periods that are identified by the affiliate interrupt analyzer 118 based on watermarks, and an example interrupts identified based on signatures row 820 which indicates interrupt periods that are identified by the affiliate interrupt analyzer 118 based on audio signatures.

In some examples, the affiliate interrupt analyzer 118 utilizes only one type of codes to detect affiliate interrupts. As an example, the following procedure describes an analysis outcome utilizing only the first type of watermark to detect affiliate interrupts. At an example first time 822 in the schematic 800, network and local watermarks of the first type are detected. However, after the first time 822, there is a time period extending beyond a bridge time for the first type of network watermark during which the first type of network watermark is not detected. In some examples, the affiliate interrupt analyzer 118 determines whether a local code is detected within the bridge time of the last detected local code to determine whether an affiliate interrupt is occurring (in which case, the local code should still be detected). At an example second time 824, a local code of the first type is detected. Once the bridge time of the network code has expired without detecting a network code (e.g., shortly after the second time 824), the affiliate interrupt analyzer 118 can determine an affiliate interrupt is occurring, since local codes are present while network codes are not. However, after the second time 824, another local code is not detected within the bridge time of the local code. As a result, when analyzing only the first type of codes, the affiliate interrupt analyzer 118 may determine that no watermarks are present when an example first interrupt period 826 occurs.

Continuing analysis utilizing only watermarks of the first type, at an example third time 828, a network code is detected, but no subsequent network codes are detected within the bridge time of the network code. During this time period (e.g., during the bridge time of the network code), local codes are detected. In some such examples utilizing only the first type of watermarks, the affiliate interrupt analyzer 118 may determine an affiliate interrupt begins at the third time 828.

Continuing analysis utilizing only watermarks of the first type, at an example fourth time 830, the affiliate interrupt analyzer 118 can correctly detect an example second interrupt period 832 based on no network codes being detected within a bridge time after the fourth time 830, and local codes being detected during this period.

In some examples, the affiliate interrupt analyzer 118 utilizes more than one type of codes to detect affiliate interrupts. As an example, the following procedure utilizes both the first and second types of watermarks to detect affiliate interrupts. At the second time 824, the affiliate interrupt analyzer 118 detects local codes of the second type during the period when neither the first type of network code nor the second type of network code are detected during their bridge periods. As a result, the first interrupt period 826 can be accurately detected despite the break in local watermarks of the first type (e.g., due to a technical encoding glitch).

Continuing analysis utilizing watermarks of both the first and second types, the affiliate interrupt analyzer 118 can correctly determine that network media is being presented following the third time 828, since the second type of network code is detected when the first type of network code is not. Thus, the affiliate interrupt analyzer 118 can leverage both types of watermarks to avoid incorrectly identifying an affiliate interrupt after the third time 828 (e.g., as would occur when only utilizing the first type of watermark after the third time 828).

In some examples, when utilizing a plurality of code types to detect affiliate interrupts, bridge times of the different code types may vary. In such examples, the affiliate interrupt analyzer 118 determines and tracks respective bridge times to ensure determinations of affiliate interrupts are accurate. For example, a bridge time may be very short for a high-frequency watermark, but a watermark embedded at a low frequency may have a longer bridge time which requires more time to accurately determine an interrupt has occurred.

In some examples, the affiliate interrupt analyzer 118 can additionally or alternatively detect affiliate interrupts by comparing audio signatures generated based on an affiliate signal and reference audio signatures generated based on reference audio (e.g., audio corresponding to a national feed). In the schematic 800, when a shading of one of the affiliate signatures does not match a shading of one of the reference signatures, the signatures are identified as non-matching. In some examples, the affiliate interrupt analyzer 118 detects affiliate interrupts when a plurality of adjacent (e.g., adjacent in time) signatures satisfying a duration threshold are non-matching. For example, if signatures are generated for one second time periods, and the duration threshold is set at five seconds, the affiliate interrupt analyzer 118 would detect an affiliate interrupt when five seconds of non-matching signatures (e.g., five consecutive non-matching signatures) is determined.

Between an example fifth time 834 and an example sixth time 836 in the schematic 800, the affiliate signatures and the reference signatures do not match. In some examples, the affiliate interrupt analyzer 118 determines whether the time period between the fifth time 834 and the sixth time 836 satisfies a duration threshold. In response to the time period between the fifth time 834 and the sixth time 836 satisfying the duration threshold, the affiliate interrupt analyzer 118 detects an affiliate interrupt.

Between an example seventh time 838 and an example eighth time 840 in the schematic 800, an affiliate signature and a reference signature do not match. In some examples, this one non-matching affiliate signature between the seventh time 838 and the eighth time 840 is not enough to satisfy the duration threshold, and therefore the affiliate interrupt analyzer 118 does not identify an interrupt period.

Between an example ninth time 842 and an example tenth time 844 in the schematic 800, a plurality of affiliate signatures and reference signatures do not match. In some examples, the affiliate interrupt analyzer 118 detects an affiliate interrupt period between the ninth time 842 and the tenth time 844 in response to the time period and/or number of signatures between the ninth time 842 and the tenth time 844 satisfying a duration threshold.

The interrupts identified based on watermarks row 818 and the interrupt identified based on signatures row 820 illustrate the potential differences between affiliate interrupts detected utilizing the two methods (watermarks and audio signatures). In some examples, the interrupt periods (e.g., start times and end times) of detected affiliate interrupts are refined utilizing a secondary method. For example, if an affiliate interrupt is detected based on audio watermarks, the start and end times associated with the affiliate interrupt can be subsequently refined by performing audio signature comparison and/or video signature comparison. Any combination of one or more of the affiliate interrupt detection techniques disclosed herein may be utilized to improve the accuracy and reliability of affiliate interrupt data.

Figure 9:
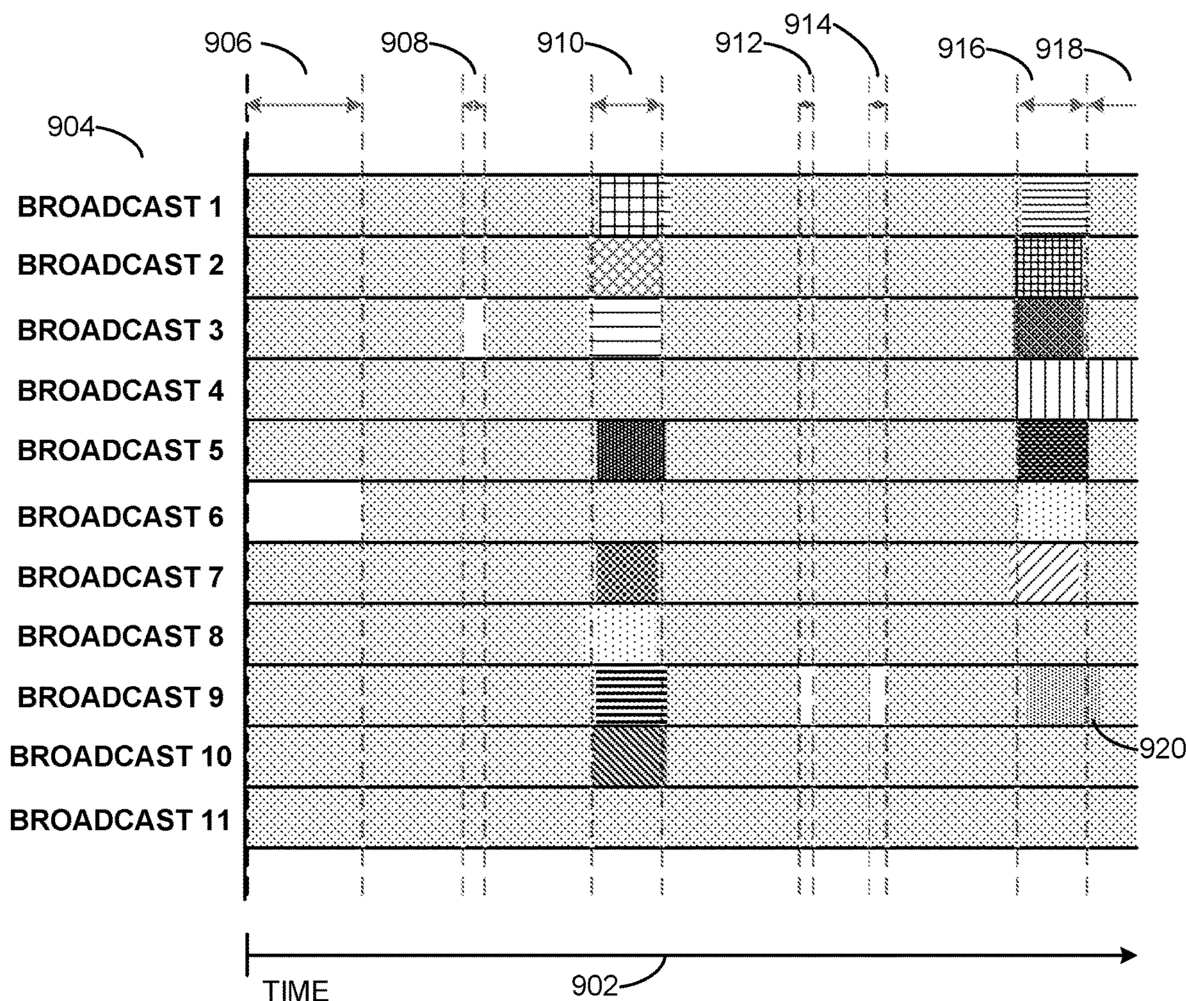
FIG. 9 is a schematic illustrating an example audio signature comparison between a plurality of audio signals to be utilized to detect affiliate interrupts using example techniques disclosed herein.

FIG. 9 is an example schematic 900 of comparison of a set of affiliate broadcasts for identification of affiliate interrupts. The example schematic 900 includes an example time axis 902 for comparison of eleven (11) example affiliate broadcasts signals listed along an example broadcast axis 904 over time. The broadcast signals are labeled as broadcast 1 through broadcast 11. The example broadcasts listed along the example broadcast axis are affiliate broadcasts, which display similar media at some times, and different media at other times.

The example schematic 900 includes several identified non-matching intervals, as identified in accordance with the teachings of this disclosure (e.g., as described in the machine readable instructions 600 of FIG. 6, etc.). In performing media comparison across the broadcast signals for the time span shown in the example schematic 900, an example first non-matching interval 906, an example second non-matching interval 908, an example third non-matching interval 910, an example fourth non-matching interval 912, an example fifth non-matching interval 914, an example sixth non-matching interval 916, and an example seventh non-matching interval 918 are identified. To determine affiliate interrupts, the techniques disclosed herein (e.g., as described in the machine readable instructions 600 of FIG. 6) determine if the non-matching intervals satisfy at least a difference quantity threshold and one or more duration thresholds.

The example first non-matching interval 906 includes broadcast 6 conveying different media than the remainder of the broadcasts. During the first non-matching interval 906, only one out of eleven broadcast signals includes different media. Hence, in some examples, it may be considered likely that this affiliate experienced an outage, as interrupts may be typically identified among multiple affiliates of the plurality of affiliate broadcasters.

The example second non-matching interval 908 includes broadcast 3 conveying different media than the remainder of the broadcasts. In some examples, the duration threshold may not be satisfied due to the second non-matching interval 908 having a relatively short duration (e.g., possibly indicative of a glitch in the broadcast, a brief interruption in the broadcast, etc.)

The example third non-matching interval 910 includes broadcasts 1 through 3, broadcast 5 and broadcasts 7 through 10 conveying unique media, and broadcasts 4, 6 and 11 conveying similar media. In some examples, the third non-matching interval 910 may satisfy the difference quantity threshold, and/or may satisfy the duration threshold. For example, the third non-matching interval 910 has ten unique media presentations conveyed during the third non-matching interval 910, which may be an indication that an affiliate interrupt took place during this interval. In some examples, the third non-matching interval 910 may satisfy the duration threshold, as the duration of the third non-matching interval 910 may be within a range of acceptable durations for an affiliate interrupt, and the unique media presentations additionally have similar presentation durations.

The example fourth non-matching interval 912 and the example fifth non-matching interval 914 include broadcast 9 conveying different media than the remainder of the broadcasts. The example fourth non-matching interval 912 and the example fifth non-matching interval 914 may each not satisfy the difference quantity threshold, and/or may each not satisfy the duration threshold.

The example sixth non-matching interval 916, similar to the third non-matching interval 910, includes many stations conveying unique media. Broadcasts 1 through 7 and broadcast 9 conveyed unique media during this interval, while broadcasts 8, 10 and 11 include similar media. Similar to the third non-matching interval 910, the sixth non-matching interval 916 may satisfy an example difference quantity threshold due to the numerous different media presentations and/or may satisfy an example duration threshold.

The example seventh non-matching interval 918 includes broadcast 4 conveying unique media relative to the remainder of the broadcasts. In some examples, broadcast 4 may have begun conveying different programming (e.g., local news, an infomercial, a new national broadcast, etc.) beginning at the sixth non-matching interval 916. In some examples wherein non-matching intervals are required to have similar characteristics (e.g., similar difference quantity characteristics, etc.) to be eligible for combination, the example sixth non-matching interval 916 and the example seventh non-matching interval 918 may not be combined. In some examples, the sixth non-matching interval 916 and the seventh non-matching interval 918 may initially be combined and subsequently may be re-divided due to the disparity in differences between media conveyed between the sixth non-matching interval 916 and the seventh non-matching interval 918. In such examples, the seventh non-matching interval 918 may not satisfy the difference quantity threshold due to there only being two unique media presentations across the broadcast signals (one for broadcast 4, and the other for all remaining broadcasts).

The example schematic 900 includes various time offsets associated with media presentations throughout the broadcast signals. For example, the example time offset 920 indicates that broadcast 9 is slightly delayed relative to broadcast 5, for example. Such offsets may be anticipated by data received from other systems indicative of slight broadcast delays, and can be subsequently accounted for when determining non-matching intervals and identifying affiliate interrupts.

Figure 10A:
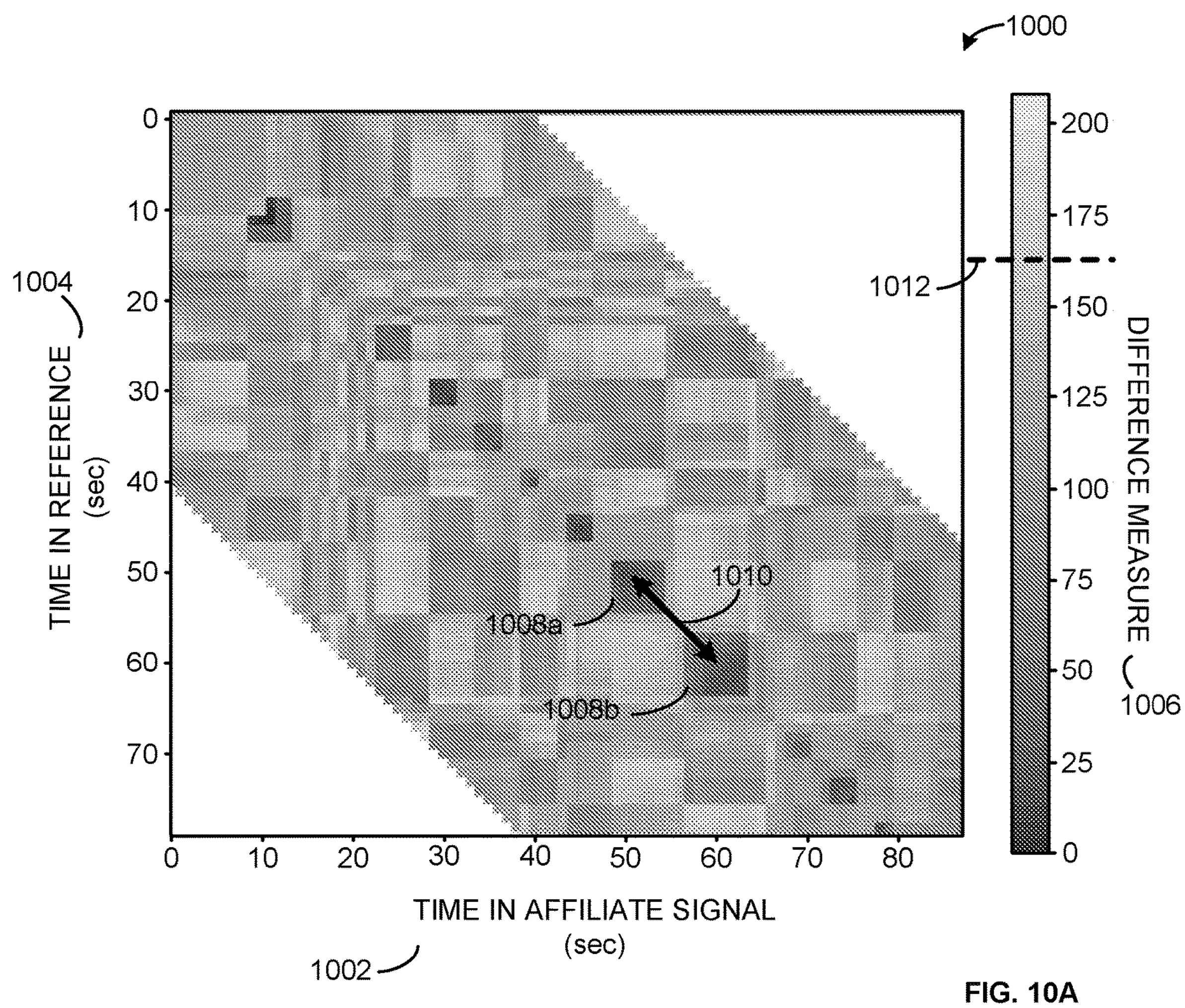
FIG. 10A is a schematic illustrating an example video signature comparison between a plurality of media signals to be utilized to detect affiliate interrupts using example techniques disclosed herein.

FIG. 10A is a schematic 1000 illustrating an example video signature comparison between a plurality of media signals to be utilized to detect affiliate interrupts using techniques disclosed herein. The schematic includes a plot including an example time in affiliate signal axis 1002 and an example time in reference signal axis 1004. The plot illustrates difference values between video signatures corresponding to the affiliate signal and video signatures corresponding to the reference signal. Difference values are illustrated based on shading, with darker shaded areas representing larger differences between the video signals than lighter shaded areas.

The schematic 1000 includes an example legend 1006 indicating the difference between video signatures represented by varying levels of shading. The legend 1006 may be in any units (e.g., a percent difference, a number of pixels in corresponding locations that vary more than a threshold, etc.).

The schematic 1000 includes an example first similar region 1008*a* and an example second similar region 1008*b*. Within the first and second similar regions 1008*a*, 1008*b*, the difference quantity between video signatures is relatively small. The first similar region 1008*a* is at approximately fifty units of time in the affiliate signal and fifty units of time in the reference signal, while the second similar region 1008*b* is at approximately sixty units of time in the affiliate signal and sixty units of time in the reference signal, indicating that the signals generally correspond in time. When the signals generally correspond in time and correspond to presentation of the same media, points on the plot where the time values match should have low difference values. Thus, when a point where the time values match has a particularly high difference value, the affiliate interrupt analyzer 118 can detect a potential affiliate interrupt.

However, due to deviations in video encoding and/or other technical factors (e.g., differences in frame rate, signal interrupts, etc.), the affiliate signal and the reference signal may not perfectly correspond in time. For example, if the affiliate signal is encoded at a slightly faster speed than the reference signal, the alignment of the signals will diverge over time. In some examples, when query video signatures are offset from the reference video signatures, if the signatures are not properly re-aligned, there may be large difference values when there is a fast motion in the media represented in the signals, resulting in very different video frames over short time periods. In such examples where one or more factors cause corresponding times to no longer correspond to the same portion of media (e.g., sixty seconds in the affiliate signal corresponds to the same media as sixty-one seconds in the reference signal, indicating a one-second offset), the affiliate interrupt analyzer 118 (e.g., via the alignment analyzer 232) can perform an alignment technique to align the times of the two signals such that video signatures at corresponding times in the media can be compared. For example, if the affiliate signal is one-second ahead of the reference signal, the video signatures of the affiliate signal can be moved back in time by one second to enabling comparison. The plot illustrated in the schematic 1000 enables a visual indication of whether video signatures of the affiliate signal are properly aligned with video signatures of the reference signal. When the video signatures from each signal are aligned, an example alignment line 1010 extending through the plot is visible.

Once the alignment line 1010 has been identified in the plot, difference quantities along the alignment line can be calculated and analyzed to identify potential affiliate interrupts. The legend 1006 of the schematic 1000 includes an example difference threshold 1012, indicating an acceptable amount of difference between two video signatures for the signatures to be considered a match. For example, in the illustrated example of FIG. 10A, the difference threshold 1012 is approximately 160. Thus, if a video signature comparison along the alignment line 1010 results in a difference value exceeding 160, the affiliate interrupt analyzer 118 may determine the video signatures do not match. The difference threshold 1012 may be set to any value, and can be tuned according to particular parameters of video to be analyzed. In some examples, the affiliate interrupt analyzer 118 additionally determines whether a duration of video signatures that does not satisfy the difference threshold (e.g., that exceed the difference threshold) satisfies a duration threshold. For example, if only two-seconds of video signatures do not match, this may not be a sufficient duration to determine an affiliate interrupt occurred (e.g., it may have been a technical error in the affiliate video signal, error in the matching algorithm based on characteristics of the video signatures, error in the alignment of video signatures, etc.).

Use of video signatures for affiliate interrupt detection can enable identification of differences that audio signature comparison and/or audio watermark analysis may not detect. For example, if an affiliate broadcaster adjusts colors, image quality, and/or any other visual feature, these changes can be detected during video signature comparison. In some examples, video signature comparison can be utilized subsequent to audio signature and/or audio watermark analysis to precisely determine start and end times of affiliate interrupts.

Figure 10B:
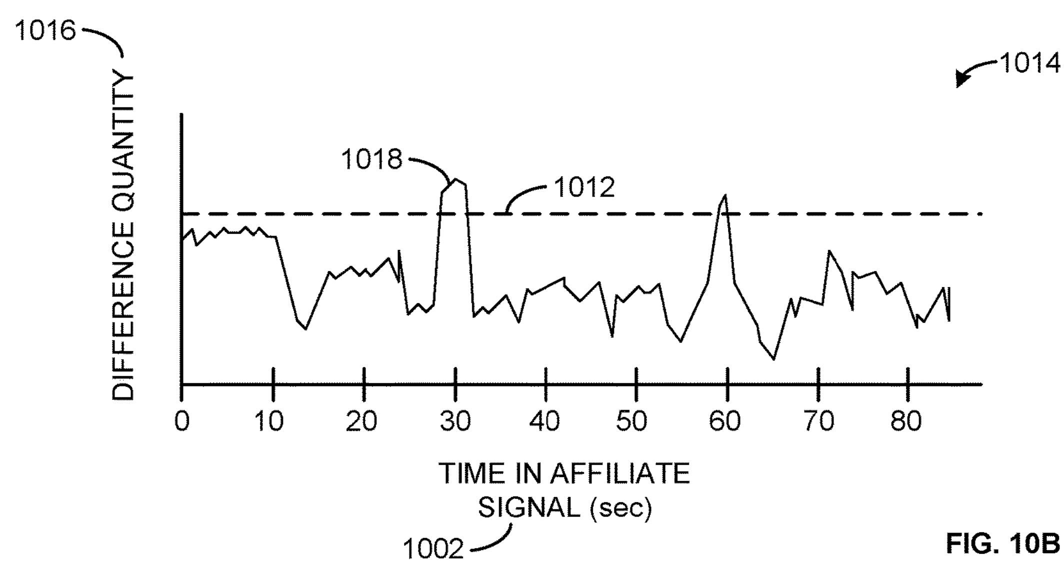
FIG. 10B is a difference quantity plot corresponding to the video signature comparison illustrated in the schematic of FIG. 10A.

FIG. 10B is a difference quantity plot 1014 corresponding to the video signature comparison illustrated in the schematic of FIG. 10A. The difference quantity plot 1014 includes the time in affiliate signal axis 1002 and an example difference quantity axis 1016. The difference quantity axis 1016 of the illustrated example measures difference values between video signatures generated based on the affiliate signal and video signatures generated based on the reference signal. In the illustrated example, example difference data 1018 corresponding to video signature comparisons along the alignment line 1010 of FIG. 10A is plotted. The difference threshold 1012 is illustrated in the difference quantity plot 1014. In the illustrated example of FIG. 10B, the difference quantity for the affiliate signal exceeds the difference thresholds twice, once between approximately twenty-eight and thirty-two seconds and again between fifty-eight and sixty seconds. In some examples, the affiliate interrupt analyzer 118 may determine that these two periods correspond to an affiliate interrupt. In some examples, the affiliate interrupt analyzer 118 may determine that the durations of these two periods is too short to correspond to an affiliate interrupt (e.g., based on the durations not satisfying an interrupt duration threshold).

Figure 11:
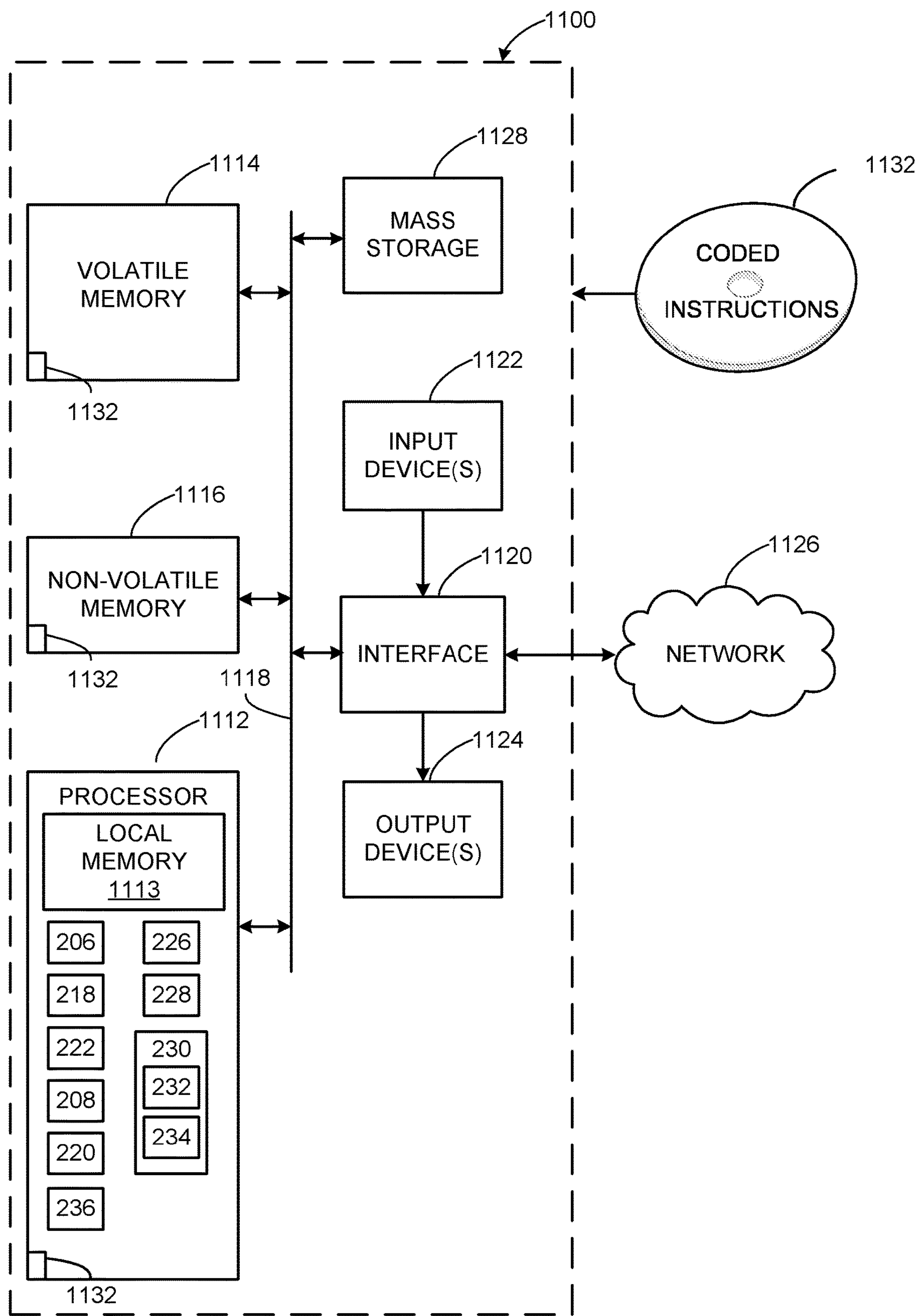
FIG. 11 is a block diagram of an example processing platform structured to execute the machine readable instructions of FIGS. 3, 4, 5, 6 and/or 7A-7B to implement the example affiliate interrupt analyzer of FIGS. 1 and/or 2.

FIG. 11 is a block diagram of an example processor platform 1100 structured to execute the instructions of FIGS. 3-7B to implement the affiliate interrupt analyzer 118 of FIG. 2. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example affiliate signal receiver 206, the example reference signal receiver 208, the example watermark detector 218, the example audio signature generator 220, the example video signature generator 222, the example interrupt identifier 224, the example watermark analyzer 226, the example audio signature analyzer 228, the example video signature analyzer 230, the example alignment analyzer 232, the example video signature comparator 234, and the example interrupt report generator 236.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 3-7B may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that enable accurate detection and analysis of affiliate interrupts on affiliate media signals. Some example methods, apparatus and articles of manufacture disclosed herein enable usage of one or more types of watermarks to be utilized to determine affiliate interrupts on an affiliate media signal. Some example methods, apparatus and articles of manufacture disclosed herein additionally or alternatively utilize audio signature comparison between a reference media signal and an affiliate signal and/or between a plurality of affiliate signals to determine affiliate interrupts with precise start and end times. Some example methods, apparatus, and articles of manufacture disclosed herein additionally or alternatively enable affiliate interrupt detection based on video signatures, providing enhanced ability to determine differences in an affiliate video signal that may not be as readily detected or even present in the corresponding audio signal. The disclosed methods, apparatus and articles of manufacture improve the efficiency of using a computing device by utilizing one or more of watermark detection, audio signature comparison, or video signature comparison to quickly and accurately detect affiliate interrupts on a media signal. The disclosed methods, apparatus and articles of manufacture are accordingly directed to one or more improvement(s) in the functioning of a computer.

An example apparatus disclosed herein includes a watermark analyzer to determine whether a first time period of a first audio signal corresponds to a first affiliate interrupt period when watermarks are detected in the first time period of the first audio signal, the watermark analyzer to determine the first time period corresponds to the first affiliate interrupt period based on whether (1) a first type of watermark is detected in the first time period of the first audio signal, and (2) a second type of watermark is detected in the first audio signal outside the first time period but not in the first time period of the first audio signal, and an audio signature analyzer to determine whether the first time period of the first audio signal corresponds to the first affiliate interrupt period when watermarks are not detected in the first time period of the first audio signal, the audio signature analyzer to determine the first time period corresponds to the first affiliate interrupt period based on comparison of first signatures representing the first time period of the first audio signal with second signatures representing a corresponding first time period of a reference audio signal.

In some examples, the first type of watermark is a final distributor watermark encoded in the first audio signal by an affiliate broadcaster after receipt of the first audio signal from a national broadcaster, and the second type of watermark is a network watermark embedded by the national broadcaster network prior to distribution of the first audio signal to the affiliate broadcaster.

In some examples, the reference audio signal is associated with media distributed from a network broadcaster, and the first audio signal is associated with media broadcast from an affiliate of the network broadcaster.

In some examples, the audio signature analyzer is to determine the first time period of the first audio signal corresponds to the first affiliate interrupt period when the first signatures representing the first time period of the first audio signal do not match the second signatures representing a corresponding first time period of a reference audio signal.

In some examples, the apparatus further includes an audio signature generator to process the first audio signal to generate the first signatures representing the first time period of the first audio signal.

In some examples, the watermark analyzer is to determine whether the first time period corresponds to the first affiliate interrupt period based on whether (1) the first type of watermark or a third type of watermark is detected in the first time period and (2) the second type of watermark or a fourth type of watermark is detected in the first audio signal outside the first time period but not in the first time period, wherein the first type of watermark and the third type of watermark correspond to final distributor watermarks and the second type of watermark and the fourth type of watermark correspond to network watermarks.

In some examples, the apparatus further includes a video signature analyzer to determine whether the first time period of the first audio signal corresponds to the first affiliate interrupt period based on comparison of (i) first video signatures generated from a first video signal associated with the first audio signal and (ii) second video signatures representative of a corresponding reference video signal associated with the reference audio signal, the video signature analyzer including a video signature generator to generate the first video signatures from the first video signal.

An example non-transitory computer readable storage medium disclosed herein comprises computer readable instructions that, when executed, cause a processor to determine whether a first time period of a first audio signal corresponds to a first affiliate interrupt period when watermarks are detected in the first time period of the first audio signal, the determining whether the first time period corresponds to the first affiliate interrupt period based on whether (1) a first type of watermark is detected in the first time period of the first audio signal, and (2) a second type of watermark is detected in the first audio signal outside the first time period but not in the first time period of the first audio signal, and determine whether the first time period of the first audio signal corresponds to the first affiliate interrupt period when watermarks are not detected in the first time period of the first audio signal, the determining whether the first time period corresponds to the first affiliate interrupt period based on comparison of first signatures representing the first time period of the first audio signal with second signatures representing a corresponding first time period of a reference audio signal.

In some examples, the first type of watermark is a final distributor watermark encoded in the first audio signal by an affiliate broadcaster after receipt of the first audio signal from a national broadcaster, and the second type of watermark is a network watermark embedded by a network prior to distribution of the first audio signal to the affiliate broadcaster.

In some examples, the instructions, when executed, cause the processor to determine the first time period of the first audio signal corresponds to the first affiliate interrupt period when the first signatures representing the first time period of the first audio signal do not match the second signatures representing a corresponding first time period of a reference audio signal.

In some examples, the instructions, when executed, cause the processor to generate the first signatures representing the first time period of the first audio signal.

In some examples, the instructions, when executed, cause the processor to determine whether the first time period corresponds to the first affiliate interrupt period based on whether (1) the first type of watermark or a third type of watermark is detected in the first time period and (2) the second type of watermark or a fourth type of watermark is detected in the first audio signal outside the first time period but not in the first time period, wherein the first type of watermark and the third type of watermark correspond to final distributor watermarks and the second type of watermark and the fourth type of watermark correspond to network watermarks.

In some examples, the instructions, when executed, cause the processor to determine whether the first time period of the first audio signal corresponds to the first affiliate interrupt period based on comparison of (i) first video signatures generated from a first video signal associated with the first audio signal and (ii) second video signatures representative of a corresponding reference video signal associated with the reference audio signal, the instructions, when executed, to cause the processor to generate the first video signatures from the first video signal.

An example method disclosed herein includes determining whether a first time period of a first audio signal corresponds to a first affiliate interrupt period when watermarks are detected in the first time period of the first audio signal, the determining the first time period corresponds to the first affiliate interrupt period based on whether (1) a first type of watermark is detected in the first time period of the first audio signal, and (2) a second type of watermark is detected in the first audio signal outside the first time period but not in the first time period of the first audio signal, and determining whether the first time period of the first audio signal corresponds to the first affiliate interrupt period when watermarks are not detected in the first time period of the first audio signal, the determining whether the first time period corresponds to the first affiliate interrupt period based on comparison of first signatures representing the first time period of the first audio signal with second signatures representing a corresponding first time period of a reference audio signal.

In some examples, the first type of watermark is a final distributor watermark encoded in the first audio signal by an affiliate broadcaster after receipt of the first audio signal from a national broadcaster, and the second type of watermark is a network watermark embedded by a network prior to distribution of the first audio signal to the affiliate broadcaster.

In some examples, the reference audio signal is associated with media distributed from a network broadcaster, and the first audio signal is associated with media broadcast from an affiliate of the network broadcaster.

In some examples, the method includes determining the first time period of the first audio signal corresponds to the first affiliate interrupt period when the first signatures representing the first time period of the first audio signal do not match the second signatures representing a corresponding first time period of a reference audio signal.

In some examples, the method includes generating the first signatures representing the first time period of the first audio signal.

In some examples, the method includes determining whether the first time period corresponds to the first affiliate interrupt period based on whether (1) the first type of watermark or a third type of watermark is detected in the first time period and (2) the second type of watermark or a fourth type of watermark is detected in the first audio signal outside the first time period but not in the first time period, wherein the first type of watermark and the third type of watermark correspond to final distributor watermarks and the second type of watermark and the fourth type of watermark correspond to network watermarks.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
at least one memory;
instructions; and
processor circuitry to execute the instructions to at least:
compare a first signature of a first affiliate signal and a second signature of a second affiliate signal to determine whether first media conveyed by the first affiliate signal and second media conveyed by the second affiliate signal match during a time segment; and
determine whether the time segment corresponds to an affiliate interrupt based on a first threshold and a second threshold, the first threshold associated with an amount of difference between the first signature and the second signature, the second threshold associated with a duration of the time segment.

2. The apparatus of claim 1, wherein the processor circuitry is to compare the first signature and the second signature based on (a) the first affiliate signal corresponding to a network broadcaster and (b) the second affiliate signal corresponding to the network broadcaster.

3. The apparatus of claim 1, wherein the first signature and the second signature correspond to the time segment.

4. The apparatus of claim 3, wherein the amount of difference between the first signature and the second signature corresponds to a percentage difference between the first signature and the second signature that is indicative of the affiliate interrupt.

5. The apparatus of claim 3, wherein the determination is a first determination, and the processor circuitry is to identify the time segment as the affiliate interrupt in response to a second determination that (i) the amount of difference between the first signature and the second signature satisfies the first threshold, and (ii) the duration of the time segment satisfies the second threshold.

6. The apparatus of claim 1, wherein the time segment is a first time segment, and the processor circuitry is to:
aggregate the first time segment and a second time segment adjacent to the first time segment into a third time segment; and
determine whether the third time segment corresponds to the affiliate interrupt based on whether the first threshold and the second threshold.

7. The apparatus of claim 1, wherein the affiliate interrupt represents a time period during which a local station may insert media different than that which is provided by a network broadcaster.

8. The apparatus of claim 1, wherein the processor circuitry is to determine whether the time segment corresponds to the affiliate interrupt in response to a determination that the first media and the second media do not match.

9. At least one non-transitory computer readable medium comprising instructions that, when executed, cause processor circuitry to at least:
compare a first signature of a first affiliate signal and a second signature of a second affiliate signal to determine whether first media conveyed by the first affiliate signal and second media conveyed by the second affiliate signal match during a time segment; and
determine whether the time segment corresponds to an affiliate interrupt based on a first threshold and a second threshold, the first threshold associated with an amount of difference between the first signature and the second signature, the second threshold associated with a duration of the time segment.

10. The at least one non-transitory computer readable medium of claim 9, wherein the instructions cause the processor circuitry to compare the first signature and the second signature based on (a) the first affiliate signal corresponding to a network broadcaster and (b) the second affiliate signal corresponding to the network broadcaster.

11. The at least one non-transitory computer readable medium of claim 9, wherein the first signature and the second signature correspond to the time segment.

12. The at least one non-transitory computer readable medium of claim 11, wherein the amount of difference between the first signature and the second signature corresponds to a percentage difference between the first signature and the second signature that is indicative of the affiliate interrupt.

13. The at least one non-transitory computer readable medium of claim 11, wherein the determination is a first determination, and the instructions cause the processor circuitry to identify the time segment as the affiliate interrupt in response to a second determination that (i) the amount of difference between the first signature and the second signature satisfies the first threshold, and (ii) the duration of the time segment satisfies the second threshold.

14. The at least one non-transitory computer readable medium of claim 9, wherein the time segment is a first time segment, and the instructions cause the processor circuitry:
aggregate the first time segment and a second time segment adjacent to the first time segment into a third time segment; and determine whether the third time segment corresponds to the affiliate interrupt based on whether the first threshold and the second threshold.

15. The at least one non-transitory computer readable medium of claim 9, wherein the affiliate interrupt represents a time period during which a local station may insert media different than that which is provided by a network broadcaster.

16. The at least one non-transitory computer readable medium of claim 9, wherein the instructions cause the processor circuitry to determine whether the time segment corresponds to the affiliate interrupt in response to a determination that the first media and the second media do not match.

17. A method comprising:

comparing, by executing an instruction with at least one processor, a first signature of a first affiliate signal and a second signature of a second affiliate signal to determine whether first media conveyed by the first affiliate signal and second media conveyed by the second affiliate signal match during a time segment; and determining, by executing an instruction with the at least one processor, whether the time segment corresponds to an affiliate interrupt based on a first threshold and a second threshold, the first threshold associated with an amount of difference between the first signature and the second signature, the second threshold associated with a duration of the time segment.

18. The method of claim 17, further including comparing the first signature and the second signature based on (a) the first affiliate signal corresponding to a network broadcaster and (b) the second affiliate signal corresponding to the network broadcaster.

19. The method of claim 17, wherein the first signature and the second signature correspond to the time segment.

20. The method of claim 19, wherein the amount of difference between the first signature and the second signature corresponds to a percentage difference between the first signature and the second signature that is indicative of the affiliate interrupt.

* * * * *